US011383676B2

(12) United States Patent
Huang et al.

(10) Patent No.: US 11,383,676 B2
(45) Date of Patent: Jul. 12, 2022

(54) VEHICLES, VEHICLE DOOR UNLOCKING CONTROL METHODS AND APPARATUSES, AND VEHICLE DOOR UNLOCKING SYSTEMS

(71) Applicant: SHANGHAI SENSETIME INTELLIGENT TECHNOLOGY CO., LTD, Shanghai (CN)

(72) Inventors: Han Huang, Shanghai (CN); Cheng Huang, Shanghai (CN); Chendi Yu, Shanghai (CN); Wenzhi Liu, Shanghai (CN)

(73) Assignee: SHANGHAI SENSETIME INTELLIGENT TECHNOLOGY CO., LTD, Shanghai (CN)

( * ) Notice: Subject to any disclaimer, the term of this patent is extended or adjusted under 35 U.S.C. 154(b) by 683 days.

(21) Appl. No.: 16/233,542

(22) Filed: Dec. 27, 2018

(65) Prior Publication Data
US 2019/0366981 A1 Dec. 5, 2019

Related U.S. Application Data

(63) Continuation of application No. PCT/CN2018/105803, filed on Sep. 14, 2018.

(30) Foreign Application Priority Data
May 31, 2018 (CN) .......................... 201810556835.3

(51) Int. Cl.
B60R 25/00 (2013.01)
B60R 25/25 (2013.01)
(Continued)

(52) U.S. Cl.
CPC .............. *B60R 25/25* (2013.01); *E05B 77/22* (2013.01); *E05B 77/44* (2013.01); *B60R 2325/20* (2013.01)

(58) Field of Classification Search
CPC ..... B60R 25/00; B60R 25/25; B60R 2325/20; E05B 77/22; E05B 77/44
(Continued)

(56) References Cited

U.S. PATENT DOCUMENTS 9,390,567 B2  7/2016 Kim et al.
2002/0097145 A1* 7/2002 Tumey .................... B60R 25/04
340/426.28
(Continued)

FOREIGN PATENT DOCUMENTS

CN  102975690 A   3/2013
CN  105882605 A   8/2016
(Continued)

OTHER PUBLICATIONS

International Search Report in the international application No. PCT/CN2018/105803, dated Feb. 27, 2019.
(Continued)

*Primary Examiner* — Suzanne L Barrett
(74) *Attorney, Agent, or Firm* — Syncoda LLC; Feng Ma

(57) ABSTRACT

Vehicle door unlocking control methods, apparatuses, and systems for vehicles. The vehicle door unlocking control method can be carried out by the apparatuses and systems and includes: obtaining an acquisition trigger signal; controlling, based on the acquisition trigger signal, a first camera assembly disposed on a vehicle to acquire a first face image of a user; performing feature matching between the first face image and a pre-stored second face image; performing living body detection on the first face image; and sending a vehicle door unlocking instruction to at least one vehicle door lock of the vehicle in response to successful feature matching and successful living body detection. This
(Continued)

door unlocking solution may be used to provide face-based vehicle door opening in a safe, convenient and reliable manner.

23 Claims, 6 Drawing Sheets

(51) Int. Cl.
*E05B 77/44* (2014.01)
*E05B 77/22* (2014.01)

(58) Field of Classification Search
USPC .............................................. 70/256; 340/5.2
See application file for complete search history.

(56) References Cited

U.S. PATENT DOCUMENTS

| | | | | |
|---|---|---|---|---|
| 2002/0152010 | A1* | 10/2002 | Colmenarez | G06K 9/6293 701/36 |
| 2004/0107031 | A1* | 6/2004 | Ichikawa | B60R 25/04 701/36 |
| 2006/0097844 | A1* | 5/2006 | Nakashima | G07C 9/00309 340/5.52 |
| 2008/0252412 | A1 | 10/2008 | Larsson | |
| 2008/0297330 | A1 | 12/2008 | Jeon | |
| 2013/0096733 | A1* | 4/2013 | Manotas, Jr. | F02N 11/0807 701/2 |
| 2014/0152422 | A1* | 6/2014 | Breed | G07C 9/32 340/5.52 |
| 2014/0204211 | A1* | 7/2014 | Gussen | B60R 25/25 348/148 |
| 2015/0221142 | A1 | 8/2015 | Kim et al. | |
| 2015/0284984 | A1* | 10/2015 | Kanter | E05F 15/74 49/31 |
| 2015/0363986 | A1* | 12/2015 | Hoyos | H04W 4/40 340/5.61 |
| 2016/0031418 | A1 | 2/2016 | Weng | |
| 2016/0300410 | A1* | 10/2016 | Jones | G06K 9/00348 |
| 2016/0311400 | A1 | 10/2016 | Gennermann | |
| 2019/0066424 | A1* | 2/2019 | Hassani | B60R 25/04 |
| 2019/0192055 | A1* | 6/2019 | Mizobuchi | B60R 11/02 |
| 2019/0263415 | A1* | 8/2019 | Gong | G06K 9/00288 |
| 2019/0299932 | A1* | 10/2019 | Porteret | G06K 9/00979 |

FOREIGN PATENT DOCUMENTS

| | | | | |
|---|---|---|---|---|
| CN | 206012545 | U | | 3/2017 |
| CN | 106951842 | A | | 7/2017 |
| CN | 207291942 | U | | 5/2018 |
| CN | 208207948 | U | | 12/2018 |
| DE | 202008005694 | U1 | | 7/2008 |
| JP | 2003301639 | A | | 10/2003 |
| JP | 2005001642 | A | | 1/2005 |
| JP | 2005092611 | A | | 4/2005 |
| JP | 2005242694 | A | | 9/2005 |
| JP | 2008143220 | A | | 6/2008 |
| JP | 2008242597 | A | | 10/2008 |
| JP | 2011090645 | A | | 5/2011 |
| JP | 2011105058 | A | | 6/2011 |
| JP | 5316995 | B2 | | 10/2013 |
| JP | 2015153258 | A | | 8/2015 |
| JP | 2016141349 | A | | 8/2016 |
| JP | 2017049867 | A | | 3/2017 |
| JP | 2017531112 | A | | 10/2017 |
| KR | 20180048916 | A | | 5/2018 |
| KR | 20210074915 | A | * 6/2021 | ......... G06K 9/00288 |
| WO | 2007008159 | A2 | | 1/2007 |
| WO | 2008147036 | A1 | | 12/2008 |
| WO | 2015091679 | A1 | | 6/2015 |

OTHER PUBLICATIONS

Supplementary European Search Report in the European application No. 18920189.0, dated Jul. 14, 2020.
English translation of the Written Opinion of the International Search Authority in the international application No. PCT/CN2018/105803, dated Feb. 27, 2019.
First Office Action of the Japanese application No. 2019-565800, dated Dec. 15, 2020.
First Office Action of the Korean application No. 10-2020-7012403, dated Jun. 17, 2021.
Second Office Action of the Japanese application No. 2019-565800, dated Aug. 17, 2021.
Third Office Action of the Japanese application No. 2019-565800, dated Feb. 22, 2022.

* cited by examiner

VEHICLES, VEHICLE DOOR UNLOCKING CONTROL METHODS AND APPARATUSES, AND VEHICLE DOOR UNLOCKING SYSTEMS

CROSS-REFERENCE TO RELATED APPLICATIONS

The present application is a continuation of International Application No. PCT/CN2018/105803, filed on Sep. 14, 2018, which claims priority to Chinese Patent Application CN201810556835.3, filed with the Chinese Patent Office on May 31, 2018, and entitled "VEHICLES, VEHICLE DOOR UNLOCKING CONTROL METHODS AND APPARATUSES, AND VEHICLE DOOR UNLOCKING SYSTEMS". All of the aforementioned applications are incorporated herein by reference in their entirety.

TECHNICAL FIELD

The present disclosure relates to the technical field of vehicle unlocking, and in particular, to vehicles, vehicle door unlocking control methods and apparatuses, and vehicle door unlocking systems.

BACKGROUND

With the development of technologies, modern intelligent locks have been quickly promoted, for example, IC card is a novel intelligent identification card (including a sensing card, an IC card, a TM card and the like), which stores information by using a silicon chip, has a large storage capacity, a good anti-counterfeiting property and high reliability compared with a conventional identification card (such as a magnetic card, a barcode card, and a photoelectric card), and is widely applied in vehicle door locks.

SUMMARY

Embodiments of the present disclosure provide technical solutions for vehicles and vehicle door unlocking.

A vehicle door unlocking control method provided according to a first aspect of the embodiments of the present disclosure includes:

obtaining an acquisition trigger signal;

controlling, based on the acquisition trigger signal, a first camera assembly disposed on a vehicle to acquire a first face image of a user;

performing feature matching between the first face image and a pre-stored second face image;

performing living body detection on the first face image; and sending a vehicle door unlocking instruction to at least one vehicle door lock of the vehicle in response to successful feature matching and successful living body detection.

In a possible implementation of the first aspect, the obtaining the acquisition trigger signal includes:

obtaining the acquisition trigger signal by an acquisition apparatus disposed on the vehicle, wherein the acquisition apparatus comprises a contact type acquisition apparatus or a non-contact type acquisition apparatus, wherein the contact type acquisition apparatus is disposed on at least one of the following locations: a pillar B of the vehicle, at least one vehicle door handle, at least one vehicle door, and at least one rear-view mirror, and the non-contact type acquisition apparatus is disposed on at least one of the following locations: the pillar B of the vehicle, at least one vehicle door, and at least one rear-view mirror.

In a possible implementation of the first aspect, the contact type acquisition apparatus comprises a fingerprint acquisition apparatus, and the acquisition trigger signal comprises fingerprint data, and the controlling, based on the acquisition trigger signal, a first camera assembly disposed on a vehicle to acquire a first face image of a user comprises:

controlling, if the fingerprint data acquired by a fingerprint acquisition apparatus matches pre-stored fingerprint data, the first camera assembly to acquire the first face image of the user.

In a possible implementation of the first aspect, the non-contact type acquisition apparatus comprises a first camera, and the acquisition trigger signal comprises gesture information, wherein the first camera is any camera in the first camera assembly, wherein the controlling, based on the acquisition trigger signal, a first camera assembly disposed on a vehicle to acquire a first face image of a user comprises:

controlling, if the gesture information acquired by the first camera matches pre-stored gesture information, the first camera assembly to acquire the first face image of the user, wherein the sampling frequency of the first camera is lower than a preset sampling frequency.

In a possible implementation of the first aspect, the non-contact type acquisition apparatus comprises a voice acquisition apparatus, and the acquisition trigger signal comprises voice information, and the controlling, based on the acquisition trigger signal, a first camera assembly disposed on a vehicle to acquire a first face image of a user comprises:

controlling, if the voice information acquired by the voice acquisition apparatus matches pre-stored voice information, the first camera assembly to acquire the first face image of the user.

In a possible implementation of the first aspect, the obtaining an acquisition trigger signal comprises:

receiving a control instruction sent by a terminal device communicationally connected to the vehicle, the acquisition trigger signal comprising the control instruction.

In a possible implementation of the first aspect, before the obtaining the acquisition trigger signal by an acquisition apparatus disposed on the vehicle, the method further comprises:

controlling the acquisition apparatus to be turned on, if it is detected that a vehicle engine is off, a duration during which the vehicle engine is off exceeds a preset duration, the vehicle engine is off and the vehicle door is locked, or, a start control signal of the acquisition apparatus is received.

In a possible implementation of the first aspect, after the sending a vehicle door unlocking instruction to at least one vehicle door lock of the vehicle in response to successful feature matching and successful living body detection, the method further comprises:

controlling the acquisition apparatus to be turned off.

In a possible implementation of the first aspect, before the obtaining an acquisition trigger signal, the method further comprises:

receiving a monitoring instruction sent by a monitoring apparatus disposed on the vehicle, the monitoring instruction being sent by the monitoring apparatus when monitoring that a duration during which a human body stays in front of the vehicle door is greater than a preset value;

controlling, according to the monitoring instruction, the first camera assembly to perform photographing, to obtain monitoring data; and saving the monitoring data.

In a possible implementation of the first aspect, after the sending a vehicle door unlocking instruction to at least one vehicle door lock of the vehicle in response to successful feature matching and successful living body detection, the method further comprises:

controlling a second camera to acquire a third face image of a driver, the second camera being disposed inside the vehicle;

performing feature matching between the third face image and a pre-stored driver image; and sending, if the facial features of the third face image do not match the facial features of the driver image, a vehicle start stopping instruction to a vehicle starting apparatus.

In a possible implementation of the first aspect, the first camera assembly comprises a plurality of cameras at different heights, wherein the first camera assembly comprises at least one 3D depth camera; and/or the first camera assembly comprises at least one RGB camera or infrared camera, wherein the first camera assembly comprises at least one camera disposed inside the vehicle; and/or the first camera assembly comprises at least one camera disposed at the pillar B of the vehicle, the vehicle door, or the rear-view mirror.

In a possible implementation of the first aspect, the method further comprises:

displaying, by a display device, at least one of the following information: the image acquisition result of the first camera assembly, the operating state of the vehicle, and the feature matching results of the first face image and the second face image, the living body detection result of the first face image, the unlocking result of the vehicle door, and the obtaining result of the acquisition trigger signal.

In a possible implementation of the first aspect, wherein the display device is disposed on at least one of the following locations: the pillar B of the vehicle, the vehicle door of the vehicle, and the rear-view mirror of the vehicle, wherein at least camera in the first camera assembly is disposed on the display device.

A vehicle provided according to a second aspect of the embodiments of the present disclosure includes:

a vehicle body, where the vehicle body is provided with a first camera assembly and a vehicle door unlocking controller, the vehicle door unlocking controller includes a face comparator, a living body detector, and an unlocking controller, the face comparator is connected to the first camera assembly and the unlocking controller, the living body detector is connected to the first camera assembly and the unlocking controller, and the unlocking controller is connected to at least one vehicle door lock of the vehicle body.

In a possible implementation of the second aspect, the vehicle body is further provided with a contact type acquisition apparatus or a non-contact type acquisition apparatus, wherein the contact type acquisition apparatus is connected to the first camera assembly and configured to acquire the acquisition trigger signal for triggering the first camera assembly to work, and the non-contact type acquisition apparatus being connected to the first camera assembly and configured to acquire the acquisition trigger signal for triggering the first camera assembly to work, wherein the contact type acquisition apparatus is disposed on at least one of the following locations: a pillar B of the vehicle, at least one vehicle door handle, at least one vehicle door, and at least one rear-view mirror, and the non-contact type acquisition apparatus is disposed on at least one of the following locations: the pillar B of the vehicle, at least one vehicle door, and at least one rear-view mirror.

In a possible implementation of the second aspect, the contact type acquisition apparatus comprises a fingerprint acquisition apparatus disposed on an outdoor part of the vehicle body, and a touch sensor disposed on the outdoor part of the vehicle body.

In a possible implementation of the second aspect, the non-contact type acquisition apparatus comprises a first camera, wherein the first camera is any camera in the first camera assembly, wherein the first camera is disposed on at least one of the following locations: the pillar B of the vehicle body, at least one rear-view mirror of the vehicle body, and at least one vehicle door of the vehicle body, wherein the sampling frequency of the first camera is lower than a preset sampling frequency.

In a possible implementation of the second aspect, the non-contact type acquisition apparatus comprises a voice acquisition apparatus, wherein the voice acquisition apparatus is disposed on at least one of the following locations: at least one vehicle door handle of the vehicle body, a pillar B of the vehicle body, at least one rear-view mirror of the vehicle body, and at least one vehicle door of the vehicle body.

In a possible implementation of the second aspect, the first camera assembly is communicationally connected to a terminal device, and the terminal device is configured to send the acquisition trigger signal for triggering the first camera assembly to work.

In a possible implementation of the second aspect, the vehicle body further comprises a monitoring apparatus connected to the first camera assembly and configured to send a monitoring instruction to the first camera assembly when monitoring that a duration during which a human body stays in front of the vehicle door is greater than a preset value, the first camera assembly performing photographing based on the control of the monitoring instruction, to obtain monitoring data.

In a possible implementation of the second aspect, a second camera connected to the face comparator is disposed inside the vehicle body, and the second camera is configured to send a captured driver image to the face comparator.

In a possible implementation of the second aspect, the first camera assembly comprises a plurality of cameras at different heights, wherein the first camera assembly comprises at least one 3D depth camera, or the first camera assembly comprises at least one RGB camera or infrared camera, wherein the first camera assembly comprises at least one camera disposed inside the vehicle body, or the first camera assembly comprises at least one camera disposed at the pillar B of the vehicle body, the vehicle door, or the rear-view mirror.

In a possible implementation of the second aspect, a display device is disposed on an outdoor part of the vehicle body, and the display device is connected to at least one of the first camera assembly, the face comparator, the living body detector, and the unlocking controller, wherein the display device is disposed on at least one of the following locations: the pillar B of the vehicle body, the vehicle door of the vehicle body, and the rear-view mirror of the vehicle body, wherein at least camera in the first camera assembly is disposed on the display device.

A vehicle door unlocking control apparatus provided according to a third aspect of the embodiments of the present disclosure includes:

a processor, and a memory storing instructions, wherein the instructions, when executed by the processor, cause the processor to perform operations, the operations comprising: obtaining an acquisition trigger signal;

controlling, based on the acquisition trigger signal, a first camera assembly disposed on a vehicle to acquire a first face image of a user;

performing feature matching between the first face image and a pre-stored second face image;

performing living body detection on the first face image; and sending a vehicle door unlocking instruction to at least one vehicle door lock of the vehicle in response to successful feature matching and successful living body detection.

A non-transitory computer-readable storage medium provided according to a ninth aspect of the embodiments of the present disclosure, configured to store computer-readable instructions, where when the instructions are executed, the operations in the steps of the vehicle door unlocking control method according to any one of the embodiments described above are implemented.

In the vehicles, the vehicle door unlocking control methods and apparatuses provided by the embodiments of the present disclosure, an acquisition trigger signal is obtained; a first camera assembly is controlled to acquire a first face image of a user; feature matching is performed between the first face image and a pre-stored second face image, and living body detection is performed on the first face image; and a vehicle door unlocking instruction is sent to a vehicle door lock in response to successful feature matching and successful living body detection. That is, in this embodiment, after the acquisition trigger signal is obtained, the first camera assembly on a vehicle is controlled to acquire a face image, while the first camera assembly may be in an energy-saving state such as a sleep state or a standby state according to actual situations when no rigger signal is obtained, so that a facial unlocking solution and the battery life of the vehicle in a non-traveling state match better, the universality of the application of the facial unlocking solution to vehicles is improved, promotion application is facilitated, and the problem of false unlocking can be avoided. In addition, after both facial recognition and living body detection succeed, the door lock may be opened, unlocking safety and reliability are improved, unlocking is facilitated, good interaction is achieved, and the problem of being unable to unlock due to loss of a key may be solved well.

The following further describes in detail the technical solutions of the present disclosure with reference to the accompanying drawings and embodiments.

BRIEF DESCRIPTION OF THE DRAWINGS

The accompanying drawings constituting a part of the specification are used for describing embodiments of the present disclosure and are intended to explain the principles of the present disclosure together with the descriptions.

According to the following detailed descriptions, this application can be understood more clearly with reference to the accompanying drawings.

DETAILED DESCRIPTION OF EMBODIMENTS

Figure 1:
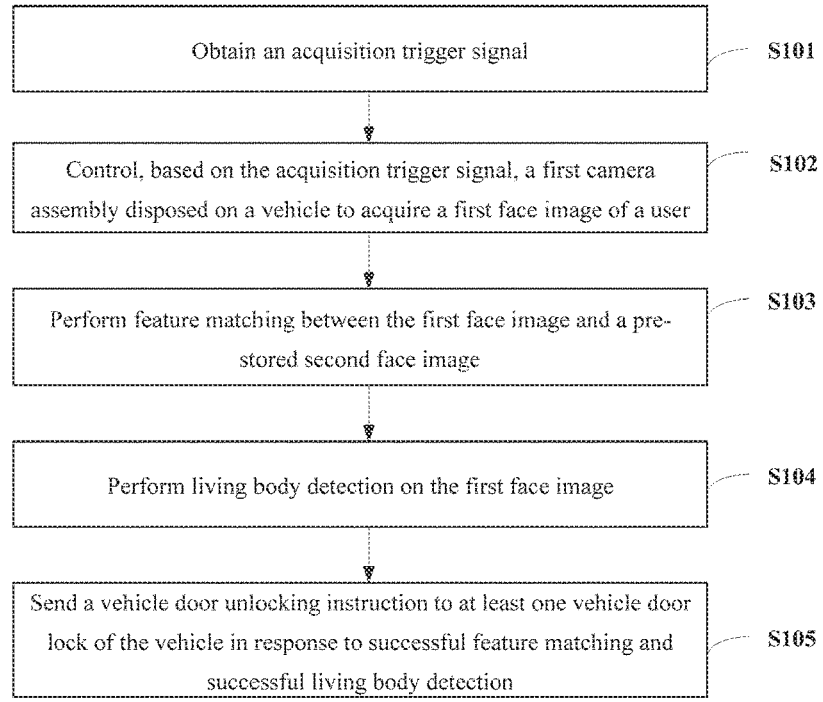
FIG. 1 is a flowchart of a vehicle door unlocking control method according to an embodiment of the present disclosure.

Various exemplary embodiments of the present disclosure are now described in detail with reference to the accompanying drawings. It should be noted that, unless otherwise stated specifically, relative arrangement of the components and steps, the numerical expressions, and the values set forth in the embodiments are not intended to limit the scope of the present disclosure.

In addition, it should be understood that, for ease of description, a size of each part shown in the accompanying drawings is not drawn in actual proportion.

The following descriptions of at least one exemplary embodiment are merely illustrative actually and are not intended to limit the present disclosure and the applications or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to a computer system/server, which may operate with numerous other general-purpose or special-purpose computing system environments or configurations. Examples of well-known computing systems, environments, and/or configurations suitable for use together with the computer system/server include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the foregoing systems, and the like.

The computer system/server may be described in the general context of computer system executable instructions (for example, program modules) executed by the computer system. Generally, the program modules may include routines, programs, target programs, components, logics, data structures, and the like, to perform specific tasks or implement specific abstract data types. The computer system/server may be practiced in the distributed cloud computing environments in which tasks are performed by remote processing devices that are linked through a communications network. In the distributed computing environments, program modules may be located in local or remote computing system storage media including storage devices.

FIG. 1 is a flowchart of a vehicle door unlocking control method according to an embodiment of the present disclosure. As shown in FIG. 1, the method according to this embodiment may include the following steps.

In S101, an acquisition trigger signal is obtained.

In an optional example, step S101 may be performed by a processor by invoking a corresponding instruction stored in a memory and may also be performed by an obtaining module 210 run by the processor.

In S102, based on the acquisition trigger signal, a first camera assembly disposed on a vehicle is controlled to acquire a first face image of a user.

In an optional example, step S102 may be performed by a processor by invoking a corresponding instruction stored in a memory and may also be performed by a control module 220 run by the processor or a first camera assembly 12 in the vehicle.

With the development of sensor technologies and artificial intelligence technologies, a biometric technology represented by facial recognition is increasingly applied. The facial recognition has features such as more security, secrecy and convenience. Based on the advantages of the facial recognition technology, optionally, this embodiment implements vehicle door unlocking by using the facial recognition technology.

The execution subject of this embodiment may be a vehicle door unlocking control apparatus; the vehicle door unlocking control apparatus may be an individual device, and may also be disposed in other device, such as an unlocking control apparatus or an unlocking control system. In some optional embodiments, the vehicle door unlocking control apparatus or the unlocking control apparatus may be disposed on a vehicle as a device of an on-board unit, and is connected to at least one vehicle door lock of the vehicle and/or a central control system of the vehicle, to implement facial unlocking control of the at least one vehicle door.

Figure 2:
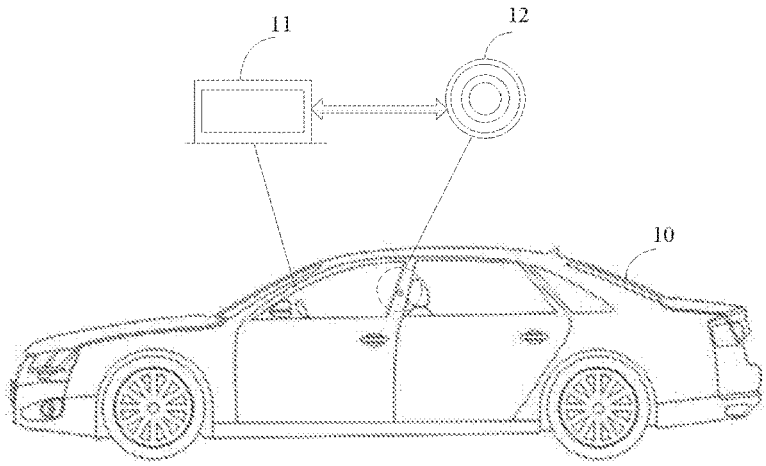
FIG. 2 is a schematic diagram of a vehicle according to an embodiment of the present disclosure.

FIG. 2 is a schematic diagram of a vehicle according to an embodiment of the present disclosure. As shown in FIG. 2, a vehicle 10 according to this embodiment is provided with a vehicle door unlocking control apparatus 11 and a first camera assembly 12; the vehicle door unlocking control apparatus 11 is communicationally connected to the first camera assembly 12 and a vehicle door lock (not shown), and the vehicle door unlocking control apparatus 11, the first camera assembly 12, and the vehicle door lock may communicate with each other.

Optionally, the first camera assembly 12 and the vehicle door unlocking control apparatus 11 are an integrated whole, i.e., the first camera assembly 12 is a part of the vehicle door unlocking control apparatus 11. Optionally, the first camera assembly 12 and the vehicle door unlocking control apparatus 11 are two different devices.

Optionally, the vehicle door lock and the vehicle door unlocking control apparatus 11 are an integrated whole, i.e., the vehicle door unlocking control apparatus 11 is a part of the vehicle door lock. Optionally, the vehicle door lock and the vehicle door unlocking control apparatus 11 are two different devices.

The vehicle door unlocking control apparatus 11 according to this embodiment has facial recognition and living body detection functions. Optionally, the vehicle door unlocking control apparatus 11 includes a face comparator, a living body detector, and a processor, where the face comparator, the living body detector, and the processor are connected to each other.

The vehicle door unlocking control apparatus 11 according to this embodiment is in a standby state.

The vehicle door unlocking control apparatus 11 according to this embodiment may be disposed outside the vehicle 10 and may also be disposed inside the vehicle 10. This embodiment does not limit the specific location where the vehicle door unlocking control apparatus 11 is disposed.

The first camera assembly in this embodiment is disposed at a location where it is easy to capture a face, for example, the first camera assembly in this embodiment may be disposed near a vehicle door, and may also be disposed at a pillar B of the vehicle 10, a rear-view mirror, or the vehicle door, and a first face image of a user may be acquired in a timely manner and accurately when the user intends to open the door.

In some optional examples, the first camera assembly 12 includes at least one camera disposed at the pillar B of the vehicle 10, the rear-view mirror, or the vehicle door.

Optionally, the first camera assembly 12 may further include at least one camera disposed inside the vehicle 10, for example, the camera may be disposed in a cab, and the user inside the vehicle or outside the vehicle may be photographed by the camera. If there is a camera in the cab, the existing camera in the cab may further be used to achieve a facial vehicle unlocking function. If there is a driver in the cab, it is convenient for the driver to view the situation of the camera. The camera included in the first camera assembly 12 may be an RGB camera, may also be an infrared camera, or may be other type of camera. This embodiment does not limit a specific type of the camera.

Optionally, the first camera assembly 12 in this embodiment may further include a plurality of cameras disposed outside the vehicle 10; these cameras are disposed at different heights along a vertical direction, for example, cameras are disposed at different heights of the pillar B of the vehicle 10, and these cameras are configured to acquire face images of the user at different heights. In some scenes, a case of sharing the vehicle 10 exists, for example, a family car will usually be used by lots of people in a family, for another example, a same regular bus will usually be used by lots of relatively constant or inconstant people, for yet another example, corresponding users of shared car rental may usually also be lots of different people. By means of the solution provided by this embodiment, the vehicle door unlocking requirements of different people for vehicle usage, without a need to repeatedly debug the camera assembly.

Optionally, the first camera assembly 12 in this embodiment has an automatic face tracking function, may automatically detect the face of the user, and acquires the face, thereby facilitating improvement in the efficiency and quality of face image acquisition.

The first camera assembly 12 in this embodiment may include a monocular 2D camera. Optionally, the first camera assembly 12 in this embodiment may further include at least one 3D depth camera (such as 3D time of flight (3DTOF) distance measuring method) camera, which has a long detection distance and high precision, and improves the acquisition precision of a face image.

The vehicle door unlocking control apparatus 11 according to this embodiment is in a standby or sleep state in a normal situation, such that electric quantity is saved, and the working time of the vehicle door unlocking control apparatus is delayed. In addition, a facial recognition phase is entered when the user intends to unlock, so that false start may be avoided.

In addition, the first camera assembly 12 is in the sleep state, the standby state, or a power-off state in the normal situation.

The triggering of the first camera assembly 12 may be implemented in many ways, for example, by means of a non-contact switch; when the non-contact switch detects that the user is within a preset distance range, an acquisition trigger signal is sent to the first camera assembly 12, and the first camera assembly 12 is automatically awakened to perform face image acquisition. Or, a contact switch may further be disposed on a lock panel, and when the user touches the contact switch, the acquisition trigger signal is sent to the first camera assembly 12, and the first camera assembly 12 is automatically awakened to perform face image acquisition. Optionally, the first camera assembly 12 may be awakened by means of a gesture or a sound, to perform face image acquisition, and this is not limited in this embodiment, and may be determined according to actual requirements.

In view of the above, the acquisition trigger signal in this embodiment is sent when the user intends to open the door, such that an accident of false door opening may be avoided, and door opening reliability is improved.

After obtaining the acquisition trigger signal, the vehicle door unlocking control apparatus 11 sends a photographing control instruction to the first camera component 12, and the first camera assembly 12 performs photographing when receiving the photographing control instruction, to acquire the first face image of the user. That is, the acquisition trigger signal in this embodiment is used for instructing the first camera assembly to acquire the first face image of the user.

The first face image of the user may be a front image or a side image of the user. This embodiment does not limit the specific content of the first face image as long as the first face image includes at least one facial feature of the user that may recognize the identity of the user. For example, there is a black nevus at the corner of the mandible of the face of the user, the identity of the user may be uniquely determined by means of the shape, size and location of the mandible, and therefore, the first face image includes just the mandible.

Optionally, the first face image in this embodiment may be an image and may also be a video captured by the first camera assembly; the video includes a plurality of first face images.

In S103, feature matching is performed between the first face image and a pre-stored second face image.

In an optional example, step S103 may be performed by a processor by invoking a corresponding instruction stored in a memory and may also be performed by a face matching module 230 run by the processor or a face comparator 131 in the vehicle.

It should be noted that, in this embodiment, identity authentication is completed before facial recognition unlocking is performed, i.e., the second face image of the user is stored in the vehicle door unlocking control apparatus 11 or a server.

Optionally, the second face image is input by the user, for example, the vehicle door unlocking control apparatus 11 according to this embodiment has a USB interface, and the user may input the stored second face image to the vehicle door unlocking control apparatus 11 by means of a storage medium such as a USB flash drive, such that the vehicle door unlocking control apparatus 11 stores the second face image.

In a possible implementation of this embodiment, an identity authentication process may include:

a second face image sent by a terminal device is received, and the second face image is stored in a database.

Optionally, during initial registration, the user first implements authentication of the terminal device (such as a mobile phone and a tablet computer) and the vehicle door unlocking control apparatus 11, and after the authentication is completed, the terminal device of the user may exchange information with the vehicle door unlocking control apparatus 11, while other terminal device that is not authenticated is unable to communicate with the vehicle door unlocking control apparatus 11. Thus, the second face image stored in the vehicle door unlocking control apparatus 11 is unloaded by the user, to prevent malicious tampering of the second face image, and to further improve unlocking accuracy and safety.

Before facial recognition is performed, the user sends the second face image of the user to the vehicle door unlocking control apparatus 11 by means of the terminal device, and the vehicle door unlocking control apparatus 11 stores locally or stores same in a network.

Optionally, the second face image is acquired by a camera on the terminal device.

When the vehicle door unlocking control apparatus 11 receives the first face image, the vehicle door unlocking control apparatus 11 performs facial recognition on the stored second face image read locally or from the network.

Before the facial recognition is performed, a face needs to be detected from the first face image and a second face image first, i.e., the face is detected from a complex background.

For example, a face detection method may include: a reference template method, a template of one or several standard faces is designed first, then a matching degree between an acquired first face image and a standard template is calculated, and whether a face exists is determined according to a threshold; and/or a face rule method, where because a face has certain structural distribution features, the so-called face rule method is extracting these features to generate a corresponding rule so as to judge whether a face exists in the first face image; and/or a skin color model method, which performs detection according to the law of relatively concentrated distribution of the facial skin color in a color space. The foregoing face detection method uses a deep learning method.

It should be noted that, the foregoing face detection method may also be comprehensively used in an actual detection system. Only exemplary descriptions are made above and are not limited in the embodiments of the present disclosure. [moo] After the face is detected, the face in the first face image is compared with the face in the pre-stored second face image.

Optionally, in this embodiment, a second face image may be pre-stored, a plurality of second face images may further be pre-stored; the plurality of second face images may be images of a same user or a plurality of users. For example, there may be two owners of a certain vehicle, such that during registration, the face images of the two owners may be sent to the vehicle door unlocking control apparatus 11, to perform a subsequent facial recognition unlocking operation.

In this embodiment, a second face image is pre-stored, the vehicle door unlocking control apparatus directly matches facial features corresponding to the first face image with facial features corresponding to the second face image. A plurality of second face images is pre-stored, the facial features of the first face image needs to be matched with the facial features of each second face image respectively, to find the second face images matched with the facial features of the first face image.

For example, a feature vector method is used, where attributes such as the sizes, locations and distances of facial contours such as eye irises, the ala of the nose, and the corners of the mouth are determined first, and then geometric features are calculated; the features form a feature vector that describes the face, and the face vector is denoted as facial features. The facial features of the first face image and the facial features of the second face image may be obtained according to the foregoing method.

Then the facial features of the first face image are compared with the facial features of the pre-stored second face image, a matching value thereof (such as a degree of similarity between two facial features) is calculated, and the matching value exceeds a preset threshold (for example, the degree of similarity between the two facial features is greater than the preset threshold, it is determined that facial recognition succeeds.

Optionally, in this embodiment, the second face image matched with the first face image may further be output to the terminal device or displayed on the vehicle door unlocking control apparatus.

In this embodiment, the second face image may be pre-stored. Optionally, the facial features corresponding to the second face image may further be pre-stored.

In S104, living body detection is performed on the first face image.

In an optional example, step S104 may be performed by a processor by invoking a corresponding instruction stored in a memory or may be performed by a living body detection module 240 run by the processor or a living body detector 132 in the vehicle.

The living body detection is used for judging whether the face in the acquired image is from a real person. In this embodiment, in order to prevent the problem of false unlocking caused by a fake face, such as a facial photo, a facial video and a three-dimensional face mask of the user, rather than the user himself/herself, the living body detection is added during the unlocking process.

[olio] It should be noted that, the execution sequence of the living body detection and the facial recognition, i.e., the sequence of S102 and S103, is not limited in this embodiment. For example, the facial recognition may be performed first, and then after the facial recognition succeeds, the living body detection is performed. Or, the living body detection is performed first, and then when it is detected that the first face image is an image of a real person, the facial recognition is performed. Optionally, the living body detection and the facial recognition may further be performed simultaneously. If either of the living body detection and the facial recognition is unsuccessful, unlocking fails, thereby further improving unlocking reliability and safety, and preventing false unlocking.

The living body detection method used in this embodiment may include, but is not limited to, the following way:

three-dimensional depth information analysis; optionally, a real face is three-dimensional, and the face surface is not flat and there is a non-rigid change on the appearance, for example, when the face is smiling or speaking, certain regions of the face will change. However, the face in the photo or video is flat, and therefore, it may be recognized, by means of in-depth analysis, that whether a real face or a fake face corresponds to the first face image.

Optionally, whether the first face image is the face of a real person may further be determined by means of optical flow analysis. Different optical flows are generated based on inconsistency of the motion of a plurality of feature points of the face, and therefore, the living body property of the face may be identified by analyzing an optical flow field of a plurality of feature points in a plurality of continuous first face images. The optical flow refers to the apparent motion of an image brightness mode. The optical flow expresses changes in the images, contains motion information of a target, and therefore may be used by an observer to determine the motion situation of the target.

Optionally, whether the first face image is the face of a real person may further be determined by means of fourier spectrum analysis. For example, the definitions of images of a real face and a photo face formed at a camera are different, and the reality of the face may be judged by analyzing a proportion of a high frequency component of the face.

Optionally, the living body detection may further by performed by detecting whether fake cue information such as edges, light reflection, and textures exists in the acquired image.

Optionally, in this embodiment, the living body detection may further be implemented in other ways, to detect whether the first face image is an image of a real person, and details are not described herein again.

In S105, a vehicle door unlocking instruction is sent to at least one vehicle door lock of the vehicle in response to successful feature matching and successful living body detection.

In an optional example, step S105 may be performed by a processor by invoking a corresponding instruction stored in a memory and may also be performed by an unlocking module 250 run by the processor or an unlocking controller 133 in the vehicle.

Optionally, according to the foregoing face detection method, it is detected that the facial features of the first face image match the facial features of the second face image, and according to the foregoing living body detection method, when it is detected that the first face image is an image of a real person, the vehicle door unlocking control apparatus sends a vehicle door unlocking instruction to at least one vehicle door lock of the vehicle. After receiving the vehicle door unlocking instruction, the vehicle door lock controls the door lock to be opened.

Optionally, the vehicle door unlocking control apparatus according to this embodiment is connected to a controller area network (CAN) bus, and the vehicle door unlocking control apparatus sends the vehicle door unlocking instruction to the vehicle door lock via the CAN bus, such that the vehicle door lock controls the vehicle door lock to be opened.

Optionally, after the vehicle door unlocking instruction is sent to the vehicle door lock, to control the vehicle door lock to be opened in S105, the method according to this embodiment may further include:

controlling the first camera assembly to be turned off, ending the unlocking process, and preventing a false operation during operation of the vehicle.

In the unlocking control method provided by an embodiment of the present disclosure, an acquisition trigger signal is obtained; a first camera assembly is controlled to acquire a first face image of a user; feature matching is performed between the first face image and a pre-stored second face image, and living body detection is performed on the first face image; and a vehicle door unlocking instruction is sent to a vehicle door lock in response to successful feature matching and successful living body detection. That is, in this embodiment, after the acquisition trigger signal is obtained, the first camera assembly on a vehicle is controlled to acquire a face image, while the first camera assembly may be in an energy-saving state such as a sleep state or a standby state according to actual situations when no rigger signal is obtained, so that a facial unlocking solution and the battery life of the vehicle in a non-traveling state match better, the universality of the application of the facial unlocking solution to vehicles, and promotion application is facilitated. In addition, after both facial recognition and living body detection succeed, the door lock may be opened, unlocking safety and reliability are improved, unlocking is facilitated, good interaction is achieved, and the problem of being unable to unlock due to loss of a key may be solved well.

In a possible implementation of this embodiment, the obtaining an acquisition trigger signal in S101 includes:

In S101*a*, the acquisition trigger signal is obtained by an acquisition apparatus disposed on the vehicle.

In an optional example, step S101*a* may be performed by a processor by invoking a corresponding instruction stored in a memory, and may also be performed by an obtaining module 210 run by the processor.

The acquisition apparatus in this embodiment may be disposed on an outdoor part of the vehicle, such as a vehicle door, a handle, a pillar B, and the tail of the vehicle. Optionally, the acquisition apparatus may further be disposed inside (or referred to as an inner chamber) the vehicle, such as a cab and secondary cab.

Optionally, the acquisition apparatus in this embodiment may be divided into a contact type acquisition apparatus and a non-contact type acquisition apparatus.

According to the difference in the acquisition apparatuses, the acquisition trigger signal in this embodiment includes at least one of gesture information, fingerprint data, a control instruction, a sensing signal, and voice information.

In some optional examples, during registration, the user may complete authentication of any one of gesture information, fingerprint data, a control instruction, a sensing signal, and voice information. For example, during the registration, preset gesture information of the user is stored, or the user's fingerprint data is stored. Or, the vehicle door unlocking control apparatus is set to enter a facial recognition phase when receiving a preset control instruction, and the first camera assembly is controlled to be turned on, or the vehicle door unlocking control apparatus is set to enter the facial recognition phase when receiving a sensing signal sent by a sensing device, and the first camera assembly is controlled to be turned on.

At this time, the vehicle door unlocking control apparatus enters the facial recognition phase when receiving the corresponding acquisition trigger signal during the registration, and the first camera assembly is controlled to acquire the first face image of the user. For example, when the vehicle door unlocking control apparatus detects that the gesture information input by the user matches pre-stored preset gesture information, the vehicle door unlocking control apparatus enters the facial recognition phase, and the first camera assembly is controlled to acquire the first face image of the user.

In another optional example, during the registration, the user may complete authentication of the gesture information, the fingerprint data, the control instruction, the sensing signal, and the voice information. For example, during the registration, the user stores the preset gesture information, the fingerprint data, and the voice information. In addition, the vehicle door unlocking control apparatus is set to enter the facial recognition phase when receiving the preset control instruction, and the vehicle door unlocking control apparatus is set to enter the facial recognition phase when receiving the sensing signal sent by the sensing device.

At this time, the vehicle door unlocking control apparatus enters the facial recognition phase when receiving any one of corresponding acquisition trigger signals during the registration, for example, when the vehicle door unlocking control apparatus detects that the gesture information input by the user matches the preset gesture information, the vehicle door unlocking control apparatus enters the facial recognition phase, and the first camera assembly is controlled to acquire the first face image of the user. Thus, the control mode for the vehicle door unlocking control apparatus may be enriched, and user experience is improved.

In another optional example, during the registration, the user may complete authentication of any combination of the gesture information, the fingerprint data, the control instruction, the sensing signal, and the voice. For example, during the registration, the user stores the preset gesture information and the fingerprint data.

At this time, the vehicle door unlocking control apparatus enters the facial recognition phase when receiving the corresponding combination of acquisition trigger signals during the registration, for example, when the vehicle door unlocking control apparatus detects that the gesture information input by the user matches the preset gesture information, and detects that the fingerprint data input by the user matches the pre-stored fingerprint data, the vehicle door unlocking control apparatus enters the facial recognition phase, and the first camera assembly is controlled to acquire the first face image of the user.

The form of the acquisition trigger signal is not limited in this embodiment, and may be determined according to actual requirements.

In an example, before obtaining the acquisition trigger signal by the acquisition apparatus disposed on the vehicle in S101a, the following step is included.

In S100a, if it is detected that a vehicle engine is off or the duration during which the vehicle engine is off exceeds a preset duration, the acquisition apparatus is controlled to be turned on.

In an optional example, step S100a may be performed by a processor by invoking a corresponding instruction stored in a memory, and may also be performed by a control module 220 run by the processor.

That is, the acquisition apparatus in this embodiment is in an off state when the vehicle normally operates, so that the electrical energy of the vehicle may be saved. When it is detected that the vehicle engine is off, the acquisition apparatus is controlled to be turned on.

Optionally, the vehicle door unlocking control apparatus is connected to the CAN bus of the vehicle, and if it is detected that the vehicle engine is off or the duration during which the vehicle engine is off exceeds a preset duration, the acquisition apparatus is controlled to be turned on. Thus, when the vehicle engine is off or the duration during which the vehicle engine is off exceeds the preset duration, the acquisition apparatus may be started in a timely manner, to acquire the acquisition trigger signal input by the user, ensure that the acquisition trigger signal is detected at a first time, and enter the subsequent unlocking process, thereby improving the unlocking timeliness of the user.

In another optional example, before obtaining the acquisition trigger signal by the acquisition apparatus disposed on the vehicle in S101a, the following step is further included.

In S100b, if it is detected that the vehicle engine is off and the vehicle door is locked, or the duration during which the vehicle engine is off exceeds the preset duration, the acquisition apparatus is controlled to be turned on.

In an optional example, step S100b may be performed by a processor by invoking a corresponding instruction stored in a memory, and may also be performed by a control module 220 run by the processor.

Optionally, the vehicle door unlocking control apparatus is connected to the CAN bus of the vehicle, and if it is detected that the vehicle engine is off and the vehicle door is locked, or the duration during which the vehicle engine is off exceeds the preset duration, the acquisition apparatus is controlled to be turned on. Thus, if detected that the vehicle engine is off and the vehicle door is locked, or the duration during which the vehicle engine is off exceeds the preset duration, i.e., when the user gets off the vehicle, the acquisition apparatus is started in a timely manner, to acquire the acquisition trigger signal input by the user, ensure that the acquisition trigger signal is detected at a first time, and enter the subsequent unlocking process, thereby improving the unlocking timeliness of the user.

In another optional example, before obtaining the acquisition trigger signal by the acquisition apparatus disposed on the vehicle in S101a, the following step is further included.

In S100c, a start control signal of the acquisition apparatus is received, the acquisition apparatus is controlled to be turned on.

In an optional example, step S100c may be performed by a processor by invoking a corresponding instruction stored in a memory, and may also be performed by a control module 220 run by the processor.

For example, a start button is provided on the acquisition apparatus, and the user may directly press the start button after getting of the vehicle or before getting on the vehicle, to send the start control signal to the acquisition apparatus, so as to control the acquisition apparatus to be turned on.

Optionally, the acquisition apparatus is communicationally connected to the terminal device, and the user sends the start control signal of the acquisition apparatus by means of the terminal device, to control the acquisition apparatus to be turned on.

In the vehicle door unlocking control method according to this embodiment, in a normal situation, the acquisition apparatus is in an off state, and if it is detected that the vehicle engine is off or the duration during which the vehicle engine is off exceeds the preset duration, or if it is detected that the vehicle engine is off and the vehicle door is locked, or the duration during which the vehicle engine is off exceeds the preset duration, the acquisition apparatus is controlled to be turned on. Thus, the electrical energy of the vehicle may be saved, and false start of the acquisition apparatus may be prevented. When the acquisition trigger signal is not required, a wrong acquisition trigger signal is sent, thereby resulting in false start of the first camera assembly, and leading to occurrence of the subsequent facial recognition and living body detection actions.

The acquisition apparatus in the embodiments of the present disclosure may include, but is not limited to, a contact type acquisition apparatus and/or a non-contact type acquisition apparatus.

The acquisition apparatus involved in FIG. 3 below includes a contact type acquisition apparatus which may be disposed on an outdoor part of the vehicle, thus acquisition of the acquisition trigger signal input by the user is facilitated.

Figure 3:
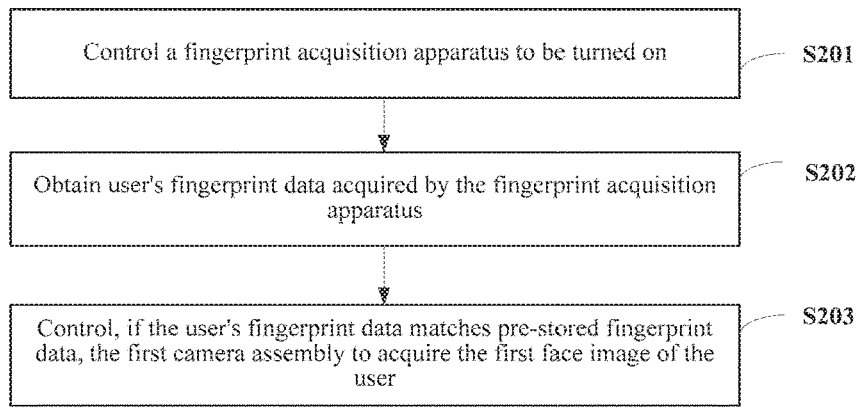
FIG. 3 is a flowchart of a vehicle door unlocking control method according to another embodiment of the present disclosure.

FIG. 3 is a flowchart of a vehicle door unlocking control method according to another embodiment of the present disclosure. The contact type acquisition apparatus in this embodiment includes a fingerprint acquisition apparatus, and the acquisition trigger signal includes fingerprint data. As shown in FIG. 3, the vehicle door unlocking control method according to this embodiment may include the following steps.

In S201, the fingerprint acquisition apparatus is controlled to be turned on.

In an optional example, step S201 may be performed by a processor by invoking a corresponding instruction stored in a memory, and may also be performed by a control module 220 run by the processor.

The mode in which the fingerprint acquisition apparatus is turned on may be implemented with reference to any mode of S100a, S100b, and S100c. Please refer to the foregoing descriptions for details, and details are not described herein again.

In S202, user's fingerprint data acquired by the fingerprint acquisition apparatus is obtained.

In an optional example, step S202 may be performed by a processor by invoking a corresponding instruction stored in a memory, and may also be performed by the contact type acquisition apparatus run by the processor.

In S203, if the user's fingerprint data matches pre-stored fingerprint data, the first camera assembly is controlled to acquire the first face image of the user.

In an optional example, step S203 may be performed by a processor by invoking a corresponding instruction stored in a memory, and may also be performed by a control module 220 run by the processor.

Optionally, in this embodiment, the fingerprint acquisition apparatus is disposed on an outdoor part of the vehicle; the fingerprint acquisition apparatus may be disposed at any location on the outdoor part of the vehicle that facilitates acquisition of user fingerprint, such as a door handle. The fingerprint acquisition apparatus in this embodiment is communicationally connected to the vehicle door unlocking control apparatus, where the connection may be, for example, a wired connection or a wireless connection.

In view of the above, during the registration, the fingerprint acquisition apparatus acquires the user's fingerprint data and stores same.

When the user opens the vehicle door, the finger when the fingerprint data is registered previously is placed on the fingerprint acquisition apparatus, the fingerprint acquisition apparatus acquires the user's fingerprint data, and matches the acquired user's fingerprint data with the pre-stored fingerprint data. If matching succeeds, the fingerprint acquisition apparatus sends a fingerprint matching success indication to the vehicle door unlocking control apparatus. After receiving the fingerprint matching success indication, the vehicle door unlocking control apparatus controls the first camera assembly to acquire the first face image of the user.

In this embodiment, the fingerprint data is used as the acquisition trigger signal, control on the vehicle door unlocking control apparatus is implemented, and the fingerprint data has an identity authentication function. First authentication may be performed on the identity of the user, and after the authentication succeeds, facial recognition is performed, and second authentication is performed, so that the unlocking safety is further improved.

In an optional example, the fingerprint acquisition apparatus in this embodiment may be disposed on the pillar B of the vehicle, and the pillar B has a stable structure and high strength, thereby facilitating configuration of the fingerprint acquisition apparatus.

In another optional example, the fingerprint acquisition apparatus in this embodiment may be disposed on any vehicle door of the vehicle, and the free area of the vehicle door is large, thereby facilitating configuration flexibility of the fingerprint acquisition apparatus. Optionally, the fingerprint acquisition apparatus may further be disposed on the vehicle door of the cab, such that after performing fingerprint acquisition, the user may wait for opening of the vehicle door in situ.

In another optional example, the fingerprint acquisition apparatus in this embodiment may further disposed on at least one vehicle door handle. The configuration features good invisibility, when the vehicle door handle may be directly replaced when damaged, and replacement costs and loss costs are low. Optionally, the fingerprint acquisition apparatus is disposed on the vehicle door handle at one side of the cab, thereby facilitating a user operation.

In another optional example, the fingerprint acquisition apparatus in this embodiment may further be disposed on at least one rear-view mirror, i.e., disposed on the left rear-view mirror or the right rear-view mirror. The configuration features good invisibility, and replacement costs and loss costs are low.

In another possible implementation of this embodiment, the contact type acquisition apparatus in this embodiment may include a touch sensor, and the acquisition trigger signal includes a touch signal.

Optionally, the touch sensor is disposed on the outdoor part of the vehicle in this embodiment, and when the user touches the touch sensor, the touch sensor sends the touch signal to the vehicle door unlocking control apparatus. The vehicle door unlocking control apparatus controls, according to the touch signal, the first camera assembly to acquire the first face image of the user.

Optionally, the touch sensor in this embodiment may be disposed at any location of the door at the outdoor part of the vehicle that facilitates user touch. For example, the touch sensor is disposed on at least one of the following locations: the pillar B of the vehicle, at least one vehicle door handle, at least one vehicle door, at least one rear-view mirror, etc. This embodiment does not limit the specific location where the touch sensor is disposed.

Optionally, the touch sensor may further be disposed at the head or tail of the vehicle, such that when passing by the head or tail, the user may touch the touch sensor first, when the user reaches the vehicle door, the vehicle door is unlocked, and thus the time of the user is saved, and the unlocking experience of the user is improved.

Optionally, the touch sensor in this embodiment is disposed on the vehicle door handle at one side of the cab, the user grips the vehicle door handle, and at the moment when the vehicle door is gripped, the touch sensor acquires the touch signal, and sends the acquired touch signal to the first camera assembly. The first camera assembly acquires the first face image of the user, and sends the first face image to the vehicle door unlocking control apparatus to complete the facial recognition and the living body detection, and when both the facial recognition and the living body detection succeed, the vehicle unlocking instruction is sent to the vehicle door lock, and the vehicle lock is opened. At this time, the user may open the vehicle door only needing to perform a conventional vehicle door opening action, i.e., holding the vehicle door handle, so that the unlocking operations of the user are simplified, and the unlocking experience of the user is improved.

The acquisition apparatus involved in FIG. 4 below includes a non-contact type acquisition apparatus; the non-contact type acquisition apparatus is disposed on the vehicle and configured to the acquisition trigger signal input by the user.

Figure 4:
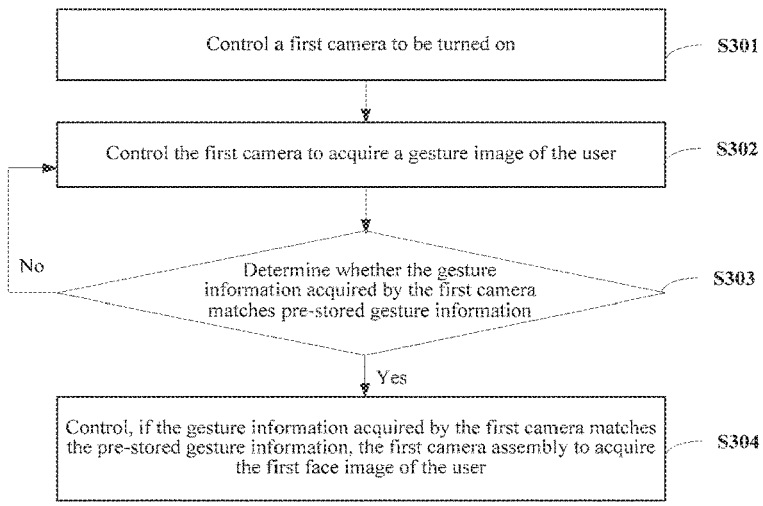
FIG. 4 is a flowchart of a vehicle door unlocking control method according to still another embodiment of the present disclosure.

FIG. 4 is a flowchart of a vehicle door unlocking control method according to still another embodiment of the present disclosure. The non-contact type acquisition apparatus in embodiment includes a first camera, and the acquisition trigger signal includes a gesture. As shown in FIG. 4, the vehicle door unlocking control method according to this embodiment may include the following steps.

In S301, the first camera is controlled to be turned on.

In an optional example, step S301 may be performed by a processor by invoking a corresponding instruction stored in a memory, and may also be performed by a control module 220 run by the processor.

It should be noted that, the process during which the first camera is controlled to be turned on in this embodiment may be implemented with reference to any mode of S100a, S100b, and S100c. Please refer to the foregoing descriptions for details, and details are not described herein again.

In S302, the first camera is controlled to acquire a gesture image of the user.

In an optional example, step S302 may be performed by a processor by invoking a corresponding instruction stored in a memory, and may also be performed by the non-contact type acquisition apparatus run by the processor.

Optionally, when the acquisition trigger signal in this embodiment is gesture information, before controlling, according to the received gesture information, the first camera assembly to acquire the first face image of the user, the vehicle door unlocking control apparatus first controls the first camera assembly to acquire the gesture image of the user. The first camera sends the acquired gesture image of the user to the vehicle door unlocking control apparatus, such that the vehicle door unlocking control apparatus parses the gesture image of the user.

In S303, whether the gesture information acquired by the first camera matches pre-stored gesture information is determined.

In an optional example, step S303 may be performed by a processor by invoking a corresponding instruction stored in a memory, and may also be performed by a control module 220 run by the processor.

In S304, if the gesture information acquired by the first camera matches the pre-stored gesture information, the first camera assembly is controlled to acquire the first face image of the user.

In an optional example, step S304 may be performed by a processor by invoking a corresponding instruction stored in a memory, and may also be performed by a control module 220 run by the processor.

Optionally, after receiving the gesture image of the user, the vehicle door unlocking control apparatus parses the gesture image of the user, to obtain the gesture information in the gesture image, and determines whether the gesture information acquired by the first camera matches the pre-stored gesture information. If yes, entry to a facial recognition process is determined, and the first camera assembly is controlled to acquire the first face image of the user. If it is judged that the gesture acquired by the first camera does not match the pre-stored gesture, detecting the gesture information acquired by the first camera is continued, and executing steps S302 to S303 is continued until the gesture information matched with the pre-stored gesture information is detected.

In this embodiment, the door opening intention of the user is determined by means of a gesture, simple operation, high reliability and good interaction are achieved, and the unlocking experience of the user is improved.

Optionally, the preset gesture in this embodiment may include, but is not limited to, an OK gesture or a Y gesture, etc.

In another possible implementation of this embodiment, in order to reduce the quantity of work of the first camera and the vehicle door unlocking control apparatus, the electrical energy is saved, and the sampling frequency of the first camera is lower than a preset sampling frequency.

Optionally, the first camera is turned on to acquire the gesture image of the user according to the preset sampling frequency, and sends the acquired gesture image of the user to the vehicle door unlocking control apparatus. The vehicle door unlocking control apparatus also analyzes the acquired gesture image according to the preset sampling frequency, judges whether the acquired gesture information matches the pre-stored gesture information, and if yes, controls the first camera assembly to acquire the first face image of the user. That is, in this embodiment, the gesture is acquired and detected according to a low-frequency acquisition frequency, so that the quantity of work of the first camera and the vehicle door unlocking control apparatus may be reduced.

In addition, the preset sampling frequency in this embodiment is less than a gesture keeping time of the user, for example, the time at which the user keeps the OK gesture is 2 s, and a first acquisition frequency is 1.5 s, such that the first camera acquires data at a time at an interval of 1.5 s, and it may be ensured that the gesture may be acquired when the user makes the OK gesture.

Optionally, the preset sampling frequency is lower than 5 Hz.

Optionally, the first camera in this embodiment may be disposed on the pillar B of the vehicle, and the pillar B has a stable structure and high strength, thereby facilitating configuration of the first camera.

Optionally, the first camera assembly in this embodiment may be disposed on at least one vehicle door, and the free area of the vehicle door is large, thereby facilitating configuration flexibility of the fingerprint acquisition apparatus. Optionally, the first camera assembly is disposed on the vehicle door of the cab, such that performing fingerprint acquisition, the user may wait for opening of the vehicle door in situ.

Optionally, the first camera in this embodiment may be disposed on at least one rear-view mirror, i.e., disposed on the left rear-view mirror or the right rear-view mirror. The configuration features good invisibility, and replacement costs and loss costs are low.

Optionally, the first camera in this embodiment is any camera in the first camera assembly, such that the existing first camera assembly may be fully utilized to implement obtaining of the acquisition trigger signal, and a waste of resources caused by separate configuration of the first camera.

In the vehicle door unlocking control method provided by an embodiment of the present disclosure, the first camera is controlled to acquire the gesture information of the user, and when the acquired gesture information matches the pre-stored gesture information, the first camera assembly is controlled to acquire the first face image of the user, and the facial recognition process is entered. That is, in this embodiment, the gesture information is used as the acquisition trigger signal, good human-computer interaction and simple unlocking operation the user are achieved, and the unlocking experience of the user is improved. In addition, the existing first camera assembly and vehicle door unlocking control apparatus are fully utilized to implement obtaining of the acquisition trigger signal, and a waste of resources caused by separate configuration of the first camera.

In a possible implementation of this embodiment, the non-contact type acquisition apparatus in this embodiment includes a voice acquisition apparatus, and the acquisition trigger signal includes a voice.

Optionally, during a registration phase, the user stores a preset language (for example, please open the vehicle door) in a language acquisition apparatus. Thus, when the language acquisition apparatus acquires the voice "please open the vehicle door", the voice matches the preset voice, and information such as semantics, the voice speed, the voice, to judge whether the voice is sent by the user. If the voice acquired by the voice acquisition apparatus matches a pre-stored voice, the first camera assembly is controlled to acquire the first face image of the user.

Optionally, the voice acquisition apparatus in this embodiment may be disposed at a location on the pillar B of the vehicle, at least one vehicle door, or at least one rear-view mirror that facilitates acquisition of the voice of the user.

Figure 5:
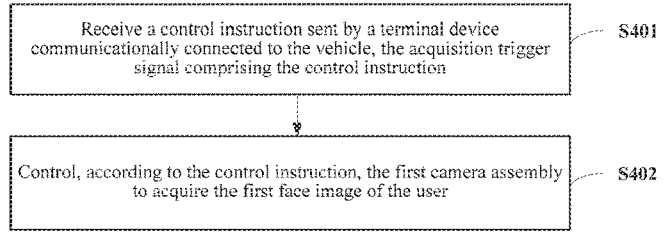
FIG. 5 is a flowchart of a vehicle door unlocking control method according to still yet another embodiment of the present disclosure.

FIG. 5 is a flowchart of a vehicle door unlocking control method according to still yet another embodiment of the present disclosure. On the basis of the foregoing embodiments, this embodiment relates to, when the acquisition trigger signal is a control instruction, the obtaining acquisition trigger signal in S101 may include the following steps:

In S401, a control instruction sent by a terminal device communicationally connected to the vehicle is received, where the acquisition trigger signal includes the control instruction.

In S402, the first camera assembly is controlled, according to the control instruction, to acquire the first face image of the user.

In an optional example, the step S401 may be performed by a processor by invoking a corresponding instruction stored in a memory, and may also be performed by an obtaining module 210 run by the processor.

In an optional example, step S402 may be performed by a processor by invoking a corresponding instruction stored in a memory, and may also be performed by a control module 220 run by the processor.

The terminal device in this embodiment is communicationally connected to the vehicle, the terminal device and the vehicle door unlocking control apparatus complete authentication, an APP corresponding to the vehicle door unlocking control apparatus is mounted on the terminal device, and the user may set various functions of the vehicle door unlocking control apparatus by means of the APP, and sends an instruction. In addition, data sent by the vehicle door unlocking control apparatus may be received.

Optionally, when the user needs to open the vehicle door, the user may send a control instruction to the vehicle door unlocking control apparatus by means of the terminal device; the control instruction is used for instructing to open the vehicle door.

After receiving the control instruction sent by the terminal device, the vehicle door unlocking control apparatus parses the control instruction, and when it is determined that the control instruction is opening the vehicle door, the first camera assembly is controlled to be turned on to acquire the first face image of the user.

The acquisition trigger signal in this embodiment is the control instruction sent by the terminal device, convenient user operation and a sample process are achieved, the unlocking time may be shortened, there is no need to provide other device separately, and the additional costs of unlocking may be reduced.

Figure 6:
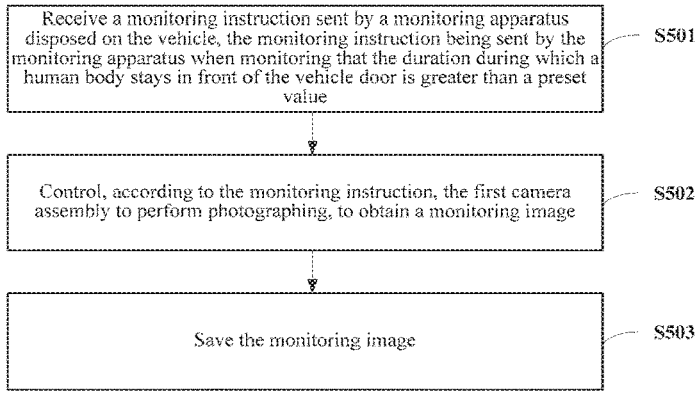
FIG. 6 is a flowchart of a vehicle door unlocking control method according to yet another embodiment of the present disclosure.

FIG. 6 is a flowchart of a vehicle door unlocking control method according to yet another embodiment of the present disclosure. On the basis of the foregoing embodiments, the first camera assembly in this embodiment may also be used as a monitor. As shown in FIG. 6, before S101, the method according to this embodiment may include the following steps.

In S501, a monitoring instruction sent by a monitoring apparatus disposed on the vehicle is received, where the monitoring instruction is sent by the monitoring apparatus when monitoring that the duration during which a human body stays in front of the vehicle door is greater than a preset value.

In an optional example, step S501 may be performed by a processor by invoking a corresponding instruction stored in a memory, and may also be performed by a receiving module 260 run by the processor.

In S502, the first camera assembly is controlled, according to the monitoring instruction, to perform photographing, to obtain a monitoring image.

In an optional example, step S502 may be performed by a processor by invoking a corresponding instruction stored in a memory, and may also be performed by a control module 220 run by the processor.

In S503, the monitoring image is saved.

In an optional example, step S503 may be performed by a processor by invoking a corresponding instruction stored in a memory, and may also be performed by a saving module 270 run by the processor.

The monitoring apparatus is disposed on the vehicle; the monitoring apparatus includes, but is not limited to, devices such as an infrared sensor and a temperature sensor that may detect a human body signal. The monitoring apparatus is communicationally connected to the vehicle door unlocking control apparatus, and the connection may be a wired connection or a wireless connection.

Optionally, the monitoring apparatus detects the human body getting closer to the vehicle door, and when the duration during which the human body stays in front of the vehicle door is greater than a preset value, the monitoring apparatus sends a monitoring instruction to the vehicle door unlocking control apparatus.

After receiving the monitoring instruction sent by the monitoring apparatus, the vehicle door unlocking control apparatus controls the first camera assembly to be turned on for photographing, to obtain monitoring data. The first camera assembly sends the obtained monitoring data to the vehicle door unlocking control apparatus, and the vehicle door unlocking control apparatus saves the monitoring data, thereby facilitating view of the user in the future.

Optionally, the vehicle door unlocking control apparatus may further send the monitoring data to the terminal device, such that the user may learn in a timely manner, by means of the terminal device, about that there is a stranger getting closer to the vehicle, thereby improving monitoring of the user on the vehicle Optionally, the user may further sends a view instruction to the vehicle door unlocking control apparatus at any time by means of the terminal device, and after receiving the view instruction, the vehicle door unlocking control apparatus controls the first camera assembly to photograph the environment around the vehicle, such that the user may view of the situation around the vehicle at any time by means of the terminal device.

When finding that there is a suspicious person getting closer to the vehicle, the monitoring apparatus in this embodiment sends the monitoring instruction to the vehicle door unlocking control apparatus, such that the vehicle door unlocking control apparatus controls the first camera assembly to monitor the surroundings of the vehicle, to form monitoring data, thereby improving the monitoring safety of the user for the vehicle.

Figure 7:
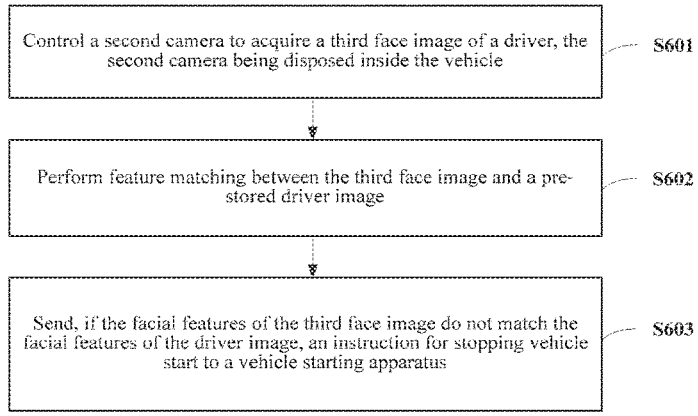
FIG. 7 is a flowchart of a vehicle door unlocking control method according to still yet another embodiment of the present disclosure.

FIG. 7 is a flowchart of a vehicle door unlocking control method according to still yet another embodiment of the present disclosure. On the basis of the foregoing embodiments, as shown in FIG. 7, after sending a vehicle door unlocking instruction to the vehicle door lock in response to successful feature matching and successful living body detection in S104, the method according to this embodiment may include the following steps:

In S601, a second camera is controlled to acquire a third face image of a driver, where the second camera is disposed inside the vehicle.

In S602, feature matching is performed between the third face image and a pre-stored driver image.

In S603, if the facial features of the third face image do not match the facial features of the driver image, a vehicle start stopping instruction is sent to a vehicle starting apparatus.

In an optional example, step S601 may be performed by a processor by invoking a corresponding instruction stored in a memory, and may also be performed by a control module 220 run by the processor.

In an optional example, step S602 may be performed by a processor by invoking a corresponding instruction stored in a memory, and may also be performed by a face matching module 230 run by the processor.

In an optional example, step S603 may be performed by a processor by invoking a corresponding instruction stored in a memory, and may also be performed by a sending module 280 run by the processor.

Optionally, in this embodiment, in order to prevent the case of violation caused by driving of a vehicle by a non-registered driver, and to further improve the anti-theft property of the vehicle, the second camera is disposed inside the vehicle, and the second camera is disposed at a location where it is easy to capture facial features of the driver, for example, the rear-view mirror of the cab.

During the registration, the user saves a legitimate driver image.

After the vehicle door is unlocked, and the vehicle door is opened, the second camera is turned on to acquire the third face image of the driver on a driving seat, and sends the acquired first face image to the vehicle door unlocking control apparatus.

After obtaining the third face image, the vehicle door unlocking control apparatus matches the facial features of the third face image with the facial features of the pre-stored driver image. If matching succeeds, a start instruction is sent to the vehicle starting apparatus. If the matching does not succeed, a vehicle start stopping instruction is sent to the vehicle starting apparatus, so that an illegitimate user may be prevented from driving the vehicle, and the vehicle is prevented from being stolen.

In this embodiment, the driver image acquired by the second camera is acquired, to judge the legitimacy of the driver, thereby avoiding the driving of the vehicle by the illegitimate user, and improving the anti-theft property of the vehicle.

In a possible implementation of this embodiment, a display device (such as a display screen) is disposed on the outdoor part of the vehicle according to this embodiment; the display device is communicationally connected to the vehicle door unlocking control apparatus. The vehicle door unlocking control apparatus sends at least one of the image acquisition result of the first camera assembly, the operating state of the vehicle, and the feature matching results of the first face image and the second face image, the living body detection result of the first face image, the unlocking result of the vehicle door, and the obtaining result of the acquisition trigger signal to the display device, and the information is displayed by the display device, so that the user learns, from the display device, about the execution situation of at least one step in the method according to the this embodiment, thereby improving user experience.

Optionally, the display device may be disposed on the pillar B of the vehicle or the vehicle door, thereby facilitating view of the user.

Optionally, the display device in this embodiment and at least one camera in the first camera assembly may constitute an integral device, i.e., at least camera in the first camera assembly is disposed on the display device, for example, at least one camera in the first camera assembly is disposed on the bezel of the display device, such that the number of arranged devices is reduced, and it is convenient to mount.

A person of ordinary skill in the art may understand that all or some steps for implementing the embodiments of the foregoing method may be achieved by a program by instructing related hardware; the foregoing program can be stored in a computer-readable storage medium; when the program is executed, steps including the embodiments of the foregoing method is executed. Moreover, the foregoing storage medium includes various media capable of storing program codes such as ROM, RAM, a magnetic disk, or an optical disk.

Figure 8:
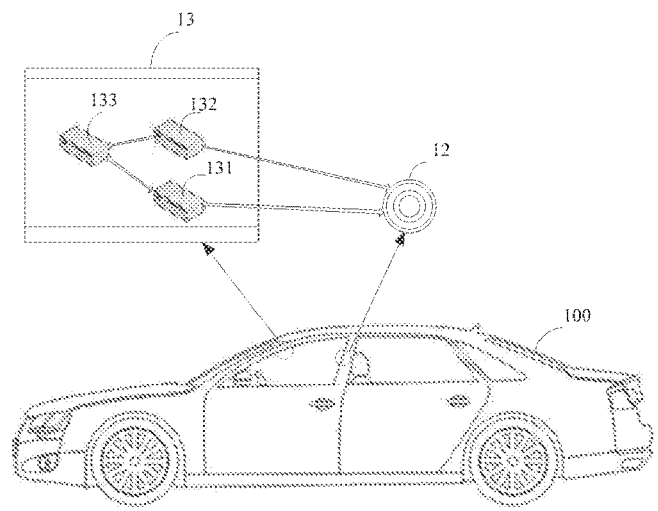
FIG. 8 is a schematic structural diagram of a vehicle according to an embodiment of the present disclosure.

FIG. 8 is a schematic structural diagram of a vehicle according to an embodiment of the present disclosure. As shown in FIG. 8, the vehicle according to this embodiment includes: a vehicle body 100; the vehicle body 100 is provided with a first camera assembly 12 and a vehicle door unlocking controller 13, the vehicle door unlocking controller 13 includes a face comparator 131, a living body detector 132, and an unlocking controller 133, the face comparator 131 is connected to the first camera assembly 12 and the unlocking controller 133, the living body detector 132 is connected to the first camera assembly 12 and the unlocking controller 133, and the unlocking controller 133 is connected to at least one vehicle door lock (not shown) of the vehicle body 100.

Optionally, as shown in FIG. 8, the first camera assembly 12 in this embodiment configured to acquire the first face image of the user, and the face comparator 131 is configured to perform feature comparison between the first face image and the pre-stored second face image, i.e., facial recognition is performed. The living body detector 132 is configured to detect whether the first face image is a face image of a real person. The unlocking controller 133 is configured to control at least one vehicle door lock to be opened.

When the user desires to open the door, the first camera assembly 12 acquires the first face image of the user, and sends the first face image to the face comparator 131 and the living body detector 132, the face comparator 131 performs feature comparison between the first face image and the pre-stores second face image, and the living body detector 132 performs living body detection on the first face image. When the face comparator 131 determines that the features of the first face image match the features of the second face image, the face comparator 131 sends a feature matching success message to the unlocking controller. When the living body detector 132 detects that the first face image is an image of a real person, the living body detector sends a living body detection success message to the unlocking controller.

When receiving the feature matching success message and the living body detection success message, the unlocking controller 133 controls the vehicle door lock to be opened, and unlocking is completed.

It should be noted that, the face comparator 131 and the living body detector 132 in this embodiment may work simultaneously, or after successful feature matching of the face comparator 131, the living body detector 132 may perform living body detection, or after successful living body detection of the living body detector 132, the face comparator 131 performs feature matching.

Optionally, the first camera assembly 12 in this embodiment includes a plurality of cameras at different heights; the plurality of cameras is configured to photograph the user at different heights.

Optionally, the first camera assembly 12 includes at least one 3D depth camera; and/or
the first camera assembly includes at least one RGB camera or infrared camera.

Optionally, the first camera assembly 12 includes at least one camera disposed inside the vehicle body 100.

Optionally, the first camera assembly 12 includes at least one camera disposed at the pillar B of the vehicle body 100, the vehicle door, or the rear-view mirror.

The vehicle unlocking process and the working mode of at least one component according to this embodiment may be implemented with reference to the foregoing embodiment of the vehicle door unlocking control method, and details are not described herein again.

Figure 9:
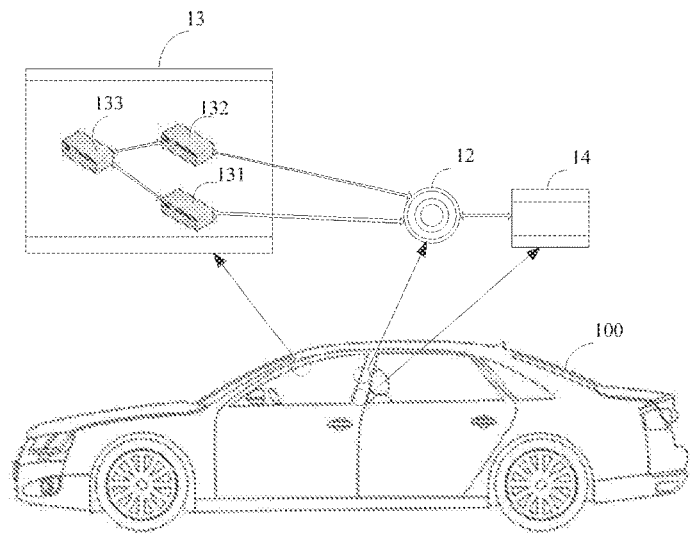
FIG. 9 is a schematic structural diagram of a vehicle according to another embodiment of the present disclosure.

FIG. 9 is a schematic structural diagram of a vehicle according to another embodiment of the present disclosure. On the basis of the foregoing embodiments, the vehicle body 100 in this embodiment is further provided with a contact type acquisition apparatus 14; the contact type acquisition apparatus 14 is connected to the first camera assembly 12 and configured to acquire the acquisition trigger signal for triggering the first camera assembly 12 to work.

The first camera assembly 12 in this embodiment is in a standby state in a normal situation, and before the first camera assembly 12 is used, the first camera assembly 12 needs to be triggered, such that the first camera assembly 12 enters a working phase.

Optionally, in this embodiment, the vehicle body 100 is provided with the contact type acquisition apparatus 14; the contact type acquisition apparatus 14 is connected to the first camera assembly 12, the contact type acquisition apparatus 14 is configured to acquire the acquisition trigger signal, and sends the acquisition trigger signal to the first camera assembly 12, and after receiving the acquisition trigger signal, the first camera assembly 12 enters a working state from the standby state.

In an optional example, the contact type acquisition apparatus 14 may include a fingerprint acquisition apparatus; the fingerprint acquisition apparatus is disposed on a part of the vehicle body 100 outside the vehicle.

In another optional example, the contact type acquisition apparatus 14 includes a touch sensor; the touch sensor is disposed on a part of the vehicle body 100 outside the vehicle.

Optionally, the contact type acquisition apparatus 14 in this embodiment includes, but is not limited to, at least one of the following locations: at least vehicle door handle of the vehicle body 100, the pillar B of the vehicle body 100, and at least one vehicle door of the vehicle body 100.

The working process and configuration of the contact type acquisition apparatus 14 may be implemented with reference to the specific descriptions of the foregoing embodiment of the vehicle door unlocking control method, and details are not described herein again.

Figure 10:
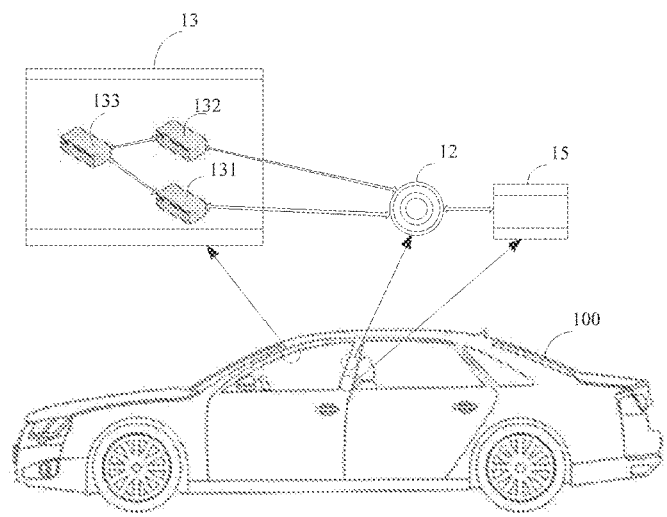
FIG. 10 is a schematic structural diagram of a vehicle according to still another embodiment of the present disclosure.

FIG. 10 is a schematic structural diagram of a vehicle according to still another embodiment of the present disclosure. On the basis of the foregoing embodiments, the vehicle body 100 in this embodiment is further provided with a non-contact type acquisition apparatus 15; the non-contact type acquisition apparatus 15 is connected to the first camera assembly 12 and configured to acquire an acquisition trigger signal for triggering the first component 12 to work.

Optionally, the vehicle body 100 in this embodiment is provided with the non-contact type acquisition apparatus 15; the non-contact type acquisition apparatus 15 is connected to the first camera assembly 12, the non-contact type acquisition apparatus 15 is configured to acquire an acquisition trigger signal, and sends the acquisition trigger signal to the first camera assembly 12, and after receiving the acquisition trigger signal, the first camera assembly 12 enters a working state from the standby state.

In an optional example, the non-contact type acquisition apparatus 15 includes a first camera (not shown); the first camera is disposed at a part of the vehicle body 100 outside the vehicle.

Optionally, the first camera is any camera in the first camera assembly 12.

Optionally, the first camera may include, but is not limited to, at least one of the following locations: the pillar B of the vehicle body 100, at least one rear-view mirror of the vehicle body 100, and at least one vehicle door of the vehicle body 100.

The working process and configuration of the first camera in this embodiment may be implemented with reference to the specific descriptions of the foregoing embodiment.

Optionally, the sampling frequency of the first camera in this embodiment is lower than a preset sampling frequency. For example, the preset sampling frequency is lower than 5 Hz.

In another optional example, the non-contact type acquisition apparatus 15 includes a voice acquisition apparatus (not shown); the voice acquisition apparatus is disposed at a part of the vehicle body 100 outside the vehicle.

Optionally, the voice acquisition apparatus may include, but is not limited to, at least one of the following locations: at least one vehicle handle of the vehicle body 100, the pillar B of the vehicle body 100, at least one rear-view mirror of the vehicle body 100, and at least one vehicle door of the vehicle body 100.

The working process and configuration of the voice acquisition apparatus may be implemented with reference to the specific descriptions of the foregoing embodiment of the vehicle door unlocking control method, and details are not described herein again.

Figure 11:
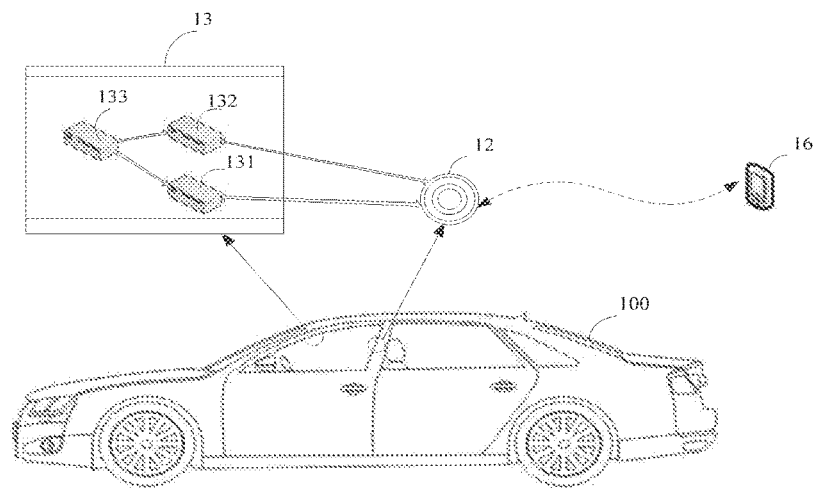
FIG. 11 is a schematic structural diagram of a vehicle according to still yet another embodiment of the present disclosure.

FIG. 11 is a schematic structural diagram of a vehicle according to still yet another embodiment of the present disclosure. On the basis of the foregoing embodiments, as shown in FIG. 11, the first camera assembly 12 in this embodiment is communicationally connected to the terminal device 16; the terminal device 16 is configured to send an acquisition trigger signal for triggering the first camera assembly 12 to work.

The terminal device 16 in this embodiment is communicationally connected to the vehicle, an APP corresponding to the vehicle door unlocking control apparatus is mounted on the terminal device 16, and the user may sends a control instruction to the first camera assembly 12 by means of the terminal device 16 when the user needs to open the vehicle door. After receiving the control instruction sent by the terminal device 16, the first camera assembly 12 starts acquiring the first face image of the user.

The interaction process between the first camera assembly 12 and the terminal device 16 in this embodiment is implemented with reference to the descriptions of the foregoing embodiment of the vehicle door unlocking control method, and details are not described herein again.

Figure 12:
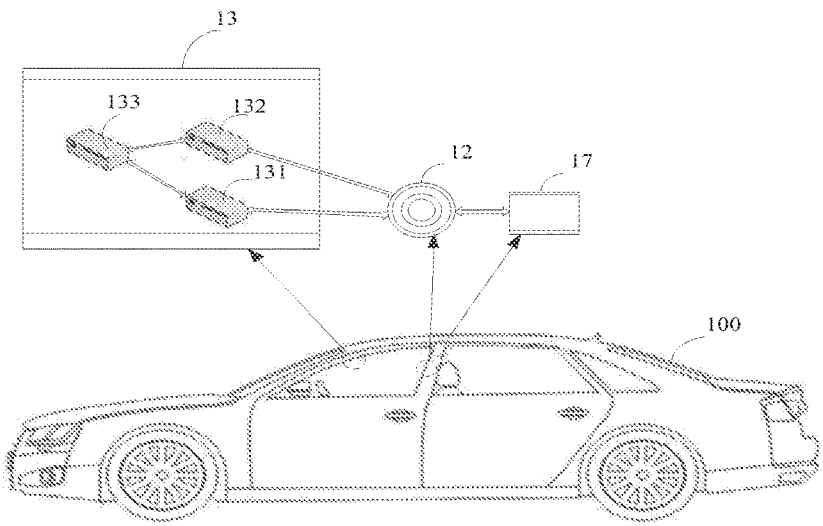
FIG. 12 is a schematic structural diagram of a vehicle according to yet another embodiment of the present disclosure.

FIG. 12 is a schematic structural diagram of a vehicle according to yet another embodiment of the present disclosure. On the basis of the foregoing embodiments, as shown in FIG. 12, the vehicle body 100 in this embodiment further includes a monitoring apparatus 17 connected to the first camera assembly 12 and configured to send a photographing instruction to the first camera assembly 12 when monitoring that the duration during which a human body stays in front of the vehicle door is greater than a preset value.

Optionally, the monitoring apparatus 17 detects the human body getting closer to the vehicle door, and when it is detected that the duration during which the human body stays in front of the vehicle door is greater than the preset value, the monitoring apparatus 17 sends a monitoring instruction to the first camera assembly 12. After receiving the monitoring instruction, the first camera assembly 12 starts photographing, to obtain monitoring data.

The monitoring apparatus 17 in this embodiment is disposed at any location of the vehicle body 100, so that detection of a signal indicating that a person getting closer is facilitated, for example, the monitoring apparatus 17 is disposed on the pillar B of the vehicle body 100, the vehicle door, or the vehicle handle.

The interaction process between the first camera assembly 12 and the monitoring apparatus 17 in this embodiment is implemented with reference to the descriptions of the foregoing embodiment, and details are not described herein again.

Figure 13:
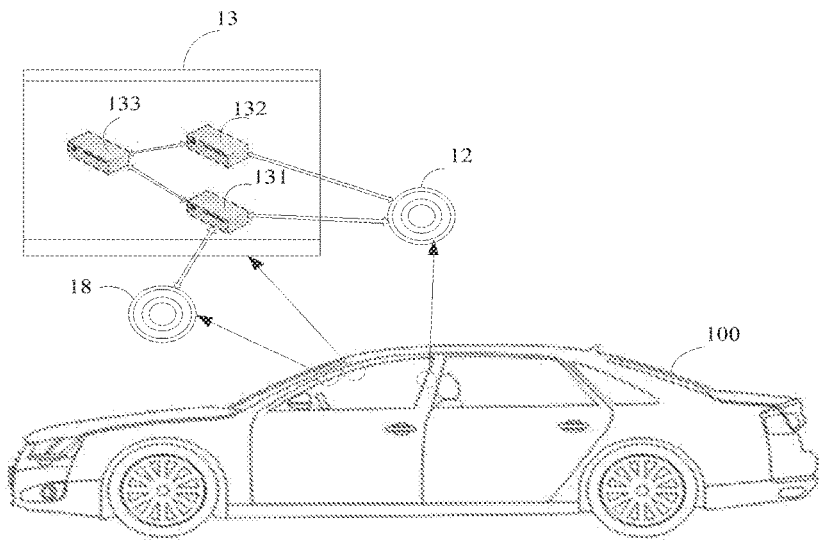
FIG. 13 is a schematic structural diagram of a vehicle according to still yet another embodiment of the present disclosure.

FIG. 13 is a schematic structural diagram of a vehicle according to still yet another embodiment of the present disclosure. On the basis of the foregoing embodiments, as shown in FIG. 13, a second camera 18 connected to the face comparator 131 is disposed inside the vehicle body 100 in this embodiment, and the second camera 18 is configured to send a captured driver image to the face comparator 131.

In actual use, after the vehicle door is unlocked and the vehicle door is opened, the second camera 18 is turned on to acquire the driver image on the driving seat, and sends the acquired driver image to the face comparator 131.

The face comparator 131 matches the facial features of the acquired driver image with the facial features of the pre-stored driver image. if matching succeeds, a start instruction is sent to the vehicle starting apparatus. If the matching does not succeed, a vehicle start stopping instruction is sent to the vehicle starting apparatus, so that an illegitimate user may be prevented from driving the vehicle, and the vehicle is prevented from being stolen.

Optionally, the first camera assembly 12 includes at least one camera disposed inside the vehicle body 100. The camera constitutes the second camera 18 in this embodiment.

The specific process of this embodiment is implemented with reference to the descriptions of the foregoing embodiment of the vehicle door unlocking control method, and details are not described herein again.

Figure 14:
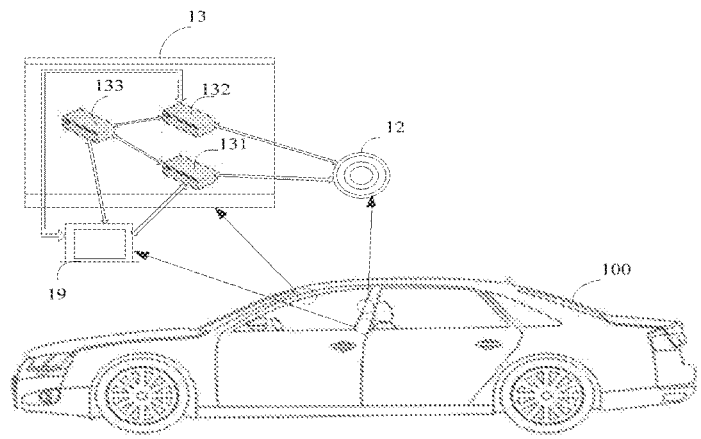
FIG. 14 is a schematic structural diagram of a vehicle according to still yet another embodiment of the present disclosure.

FIG. 14 is a schematic structural diagram of a vehicle according to still yet another embodiment of the present disclosure. On the basis of the foregoing embodiments, as shown in FIG. 14, a display device 19 is disposed on a part of the vehicle body 100 outside the vehicle in this embodiment; the display device 19 is connected to at least one of the first camera assembly 12, the face comparator 131, the living body detector 132, and the unlocking controller.

Optionally, the display device 19 is configured to display the image acquisition result of the first camera assembly 12, the feature matching result of the face comparator 131, the living body detection result of the living body detector 132, the unlocking result of the unlocking controller, etc.

Optionally, the display device 19 may include, but is not limited to, at least one of the following locations: the pillar B of the vehicle body 100, the rear-view mirror of the vehicle body 100, and the vehicle door of the vehicle body 100.

Optionally, at least one camera in the first camera assembly 12 is disposed on the display device 19.

The working process and configuration of the display device 19 in this embodiment is implemented with reference to the descriptions of the foregoing embodiment of the vehicle door unlocking control method, and details are not described herein again.

Figure 15:
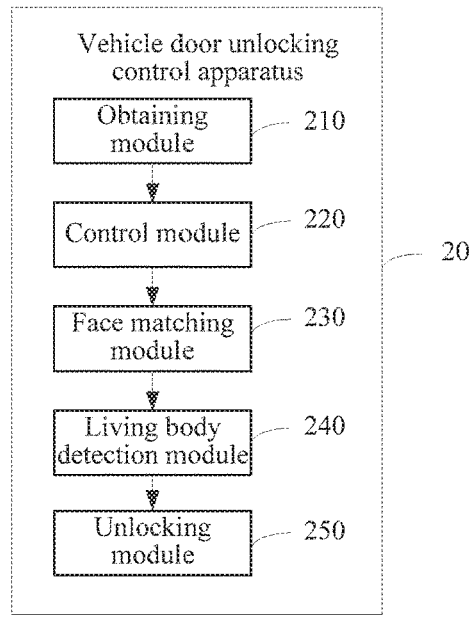
FIG. 15 is a schematic structural diagram of a vehicle door unlocking control apparatus according to an embodiment of the present disclosure.

FIG. 15 is a schematic structural diagram of a vehicle door unlocking control apparatus according to an embodiment of the present disclosure. As shown in FIG. 15, a vehicle door unlocking control apparatus 20 according to this embodiment may include:

an obtaining module 210, configured to obtain an acquisition trigger signal;

a control module 220, configured to control, based on the acquisition trigger signal, a first camera assembly disposed on a vehicle to acquire a first face image of a user;

a face matching module 230, configured to perform feature matching between the first face image and a pre-stored second face image;

a living body detection module 240, configured to perform living body detection on the first face image; and an unlocking module 250, configured to send a vehicle door unlocking instruction to at least one vehicle door lock of the vehicle in response to successful feature matching and successful living body detection.

The vehicle door unlocking control apparatus according to the embodiments of the present disclosure may be configured to execute the technical solutions in the foregoing shown method embodiments, the implementation principles and technical effects are similar, and details are not described herein again.

In a possible implementation of this embodiment, the obtaining module 210 is configured to obtain an acquisition trigger signal by an acquisition apparatus disposed on the vehicle.

In another possible implementation of this embodiment, the acquisition apparatus includes a contact type acquisition apparatus disposed on an outdoor part of the vehicle.

In another possible implementation of this embodiment, the control module 220 is configured to control, if fingerprint data acquired by the fingerprint acquisition apparatus matches pre-stored fingerprint data, the first camera assembly to acquire the first face image of the user.

In another possible implementation of this embodiment, the contact type acquisition apparatus includes a touch sensor, and the acquisition trigger signal includes a touch signal.

In another possible implementation of this embodiment, the contact type acquisition apparatus is disposed on the pillar B of the vehicle, at least one vehicle handle, at least one vehicle door, or at least rear-view mirror.

In another possible implementation of this embodiment, the acquisition apparatus includes a non-contact type acquisition apparatus disposed on the vehicle.

In another possible implementation of this embodiment, the non-contact type acquisition apparatus includes a first camera, and the acquisition trigger signal includes a gesture.

In another possible implementation of this embodiment, the first camera is any camera in the first camera assembly.

In another possible implementation of this embodiment, the control module 220 is configured to control, if the gesture acquired by the first camera matches a pre-stored gesture, the first camera assembly to acquire the first face image of the user.

In another possible implementation of this embodiment, the sampling frequency of the first camera is lower than a preset sampling frequency.

In another possible implementation of this embodiment, the preset sampling frequency is lower than 5 Hz.

In another possible implementation of this embodiment, the non-contact type acquisition apparatus includes a voice acquisition apparatus, and the acquisition trigger signal includes a voice.

In another possible implementation of this embodiment, the control module 220 may further be configured to control, if the voice acquired by the voice acquisition apparatus matches a preset voice, the first camera assembly to acquire the first face image of the user.

In another possible implementation of this embodiment, the non-contact type acquisition apparatus is disposed on an outdoor part of the vehicle.

In another possible implementation of this embodiment, the non-contact type acquisition apparatus may include, but is not limited to, at least one of the following locations: the pillar B of the vehicle, at least one vehicle door, and at least one rear-view mirror.

In another possible implementation of this embodiment, the obtaining module 210 may be configured to receive a control instruction sent by a terminal device communicationally connected to the vehicle, and the acquisition trigger signal includes the control instruction.

In another possible implementation of this embodiment, the control module 220 is further configured to control, if it is detected that the vehicle engine is off or the duration during which the vehicle engine is off exceeds a preset duration, the acquisition apparatus to be turned on.

In another possible implementation of this embodiment, the control module 220 is further configured to control, if it is detected that the vehicle engine is off and the vehicle door is locked, or the duration during which the vehicle engine is off exceeds the preset duration, the acquisition apparatus to be turned on.

In another possible implementation of this embodiment, the control module 220 is further configured to control, if a start control signal of the acquisition apparatus is received, the acquisition apparatus to be turned on.

In another possible implementation of this embodiment, the control module 220 is further configured to control, after an unlocking apparatus sends a vehicle door unlocking instruction to at least one vehicle door lock of the vehicle in response to successful feature matching and successful living body detection, the acquisition apparatus to be turned on.

The vehicle door unlocking control apparatus 20 according to the embodiments of the present disclosure may be configured to execute the technical solutions in the foregoing shown method embodiments, the implementation principles and technical effects are similar, and details are not described herein again.

Figure 16:
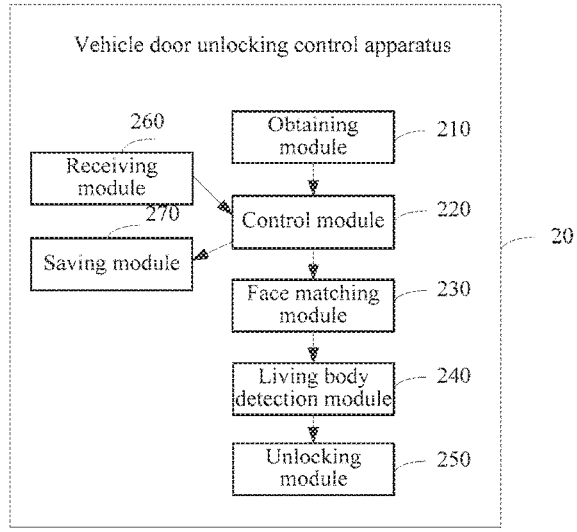
FIG. 16 is a schematic structural diagram of a vehicle door unlocking control apparatus according to another embodiment of the present disclosure.

FIG. 16 is a schematic structural diagram of a vehicle door unlocking control apparatus according to another embodiment of the present disclosure. On the basis of the foregoing embodiments, as shown in FIG. 16, the apparatus according to this embodiment further includes a receiving module 260 and a saving module 270.

The receiving module 260 is configured to receive a monitoring instruction sent by a monitoring apparatus disposed on the vehicle, where the monitoring instruction is sent by the monitoring apparatus when monitoring that the duration during which a human body stays in front of the vehicle door is greater than a preset value.

The control module 220 is further configured to control, according to the monitoring instruction, the first camera assembly to perform photographing, to obtain a monitoring image.

The saving module 270 is configured to save the monitoring image.

The vehicle door unlocking control apparatus 20 according to the embodiments of the present disclosure may be configured to execute the technical solutions in the foregoing shown method embodiments, the implementation principles and technical effects are similar, and details are not described herein again.

Figure 17:
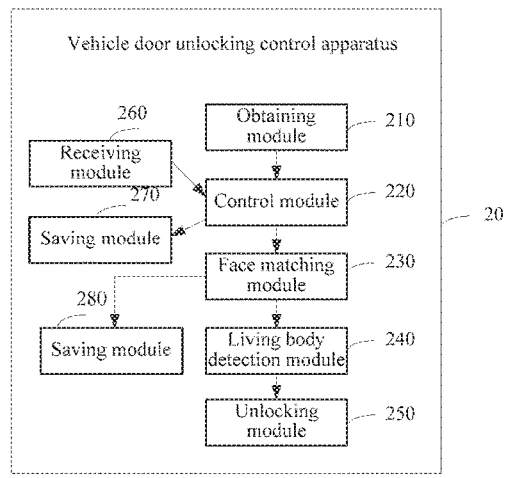
FIG. 17 is a schematic structural diagram of a vehicle door unlocking control apparatus according to still another embodiment of the present disclosure.

FIG. 17 is a schematic structural diagram of a vehicle door unlocking control apparatus according to still another embodiment of the present disclosure. On the basis of the foregoing embodiments, as shown in FIG. 17, the apparatus according to this embodiment further includes a sending module 280.

The control module 220 is further configured to control a second camera to acquire a third face image of a driver, where the second camera is disposed inside the vehicle.

The face matching module 230 is further configured to perform feature matching between the third face image and a pre-stored driver image.

The sending module 280 is configured to send, if the facial features of the third face image do not match the facial features of the driver image, a vehicle start stopping instruction to a vehicle starting apparatus.

In a possible implementation of this embodiment, the first camera assembly includes a plurality of cameras at different heights.

In another possible implementation of this embodiment, the first camera assembly includes at least one 3D depth camera; and/or The first camera assembly includes at least one RGB camera or infrared camera.

In another possible implementation of this embodiment, the first camera assembly includes at least one camera disposed inside the vehicle; and/or The first camera assembly includes at least one camera disposed at the pillar B of the vehicle, the vehicle door, or the rear-view mirror.

In another possible implementation of this embodiment, the control module is further configured to display, by a display device, at least one of the following information: the image acquisition result of the first camera assembly, the operating state of the vehicle, and the feature matching results of the first face image and the second face image, the living body detection result of the first face image, the unlocking result of the vehicle door, and the obtaining result of the acquisition trigger signal; the display device is disposed on an outdoor part of the vehicle.

In another possible implementation of this embodiment, the display device is disposed on the pillar B of the vehicle or the vehicle door.

In another possible implementation of this embodiment, at least one camera in the first camera assembly is disposed on the display device.

The vehicle door unlocking control apparatus 20 according to the embodiments of the present disclosure may be configured to execute the technical solutions in the foregoing shown method embodiments, the implementation principles and technical effects are similar, and details are not described herein again.

Figure 18:
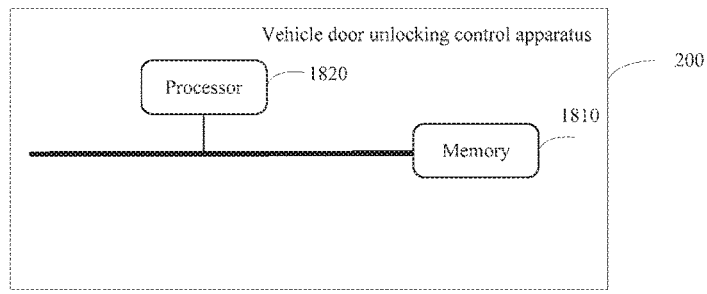
FIG. 18 is a schematic structural diagram of a vehicle door unlocking control apparatus according to still yet another embodiment of the present disclosure.

FIG. 18 is a schematic structural diagram of a vehicle door unlocking control apparatus according to still yet another embodiment of the present disclosure. As shown in FIG. 18, a vehicle door unlocking control apparatus 200 according to this embodiment includes:

a memory 1810, configured to store a computer program; and a processor 1820, configured to execute the computer program, to implement the vehicle door unlocking control method, where the implementation principles and technical effects are similar, and details are not described herein again.

Figure 19:
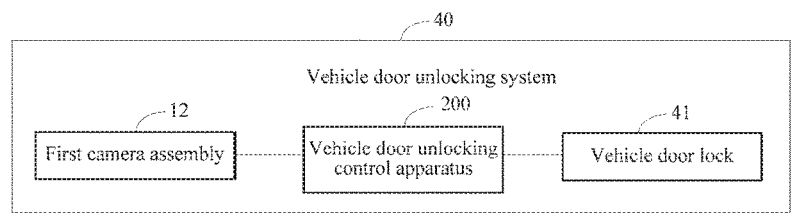
FIG. 19 is a schematic diagram of a vehicle door unlocking system according to an embodiment of the present disclosure.

FIG. 19 is a schematic diagram of a vehicle door unlocking system according to an embodiment of the present disclosure/As shown in FIG. 19, a vehicle door unlocking system 40 according to this embodiment includes: a vehicle door unlocking control apparatus 200, a first camera assembly 12, and a vehicle door lock 41 which are communicationally connected, where the vehicle door unlocking control apparatus is the vehicle door unlocking control apparatus as shown in FIG. 18.

Optionally, as shown in FIG. 19, the first camera assembly 12, the vehicle door unlocking control apparatus 200, and the vehicle door lock 41 in the vehicle door unlocking system 40 are communicationally connected to each other, and may perform data transmission. In actual use, the first camera assembly 12 acquires the first face image of the user under the control of the vehicle door unlocking control apparatus 200, and sends the acquired first face image to the vehicle door unlocking control apparatus 200. When judging that the facial features of the first face image match the facial features of the pre-stored second face image and the living body detection of the first face image succeeds, the vehicle door unlocking control apparatus 200 sends an unlocking instruction to the vehicle door lock 41, and the vehicle door is opened.

Optionally, the vehicle door unlocking system 40 according to this embodiment may further include other apparatuses, such as a fingerprint acquisition apparatus, a sensor, a monitoring apparatus, a second camera, and a display device.

Optionally, when at least some of the functions of the vehicle door unlocking control method in the embodiments of the present disclosure are implemented by software, the embodiments of the present disclosure further provide a computer storage medium; the computer storage medium is configured to store computer software instructions for unlocking the vehicle door, and when the computer software instructions are run on a computer, the computer may execute various possible vehicle door unlocking control methods in the foregoing method embodiments. When the computer executable instructions are loaded and executed on the computer, all or some of the procedures or functions according to the embodiments of the present disclosure may be generated. The computer instructions may be stored in the computer storage medium, or are transmitted from one computer storage medium to another computer storage medium, and the transmission may be performed toward another web site, computer, server or data center wirelessly (for example, cellular communications, infrared, short-range wireless, and microwave). The computer storage medium may be any available medium accessible by the computer or a data storage device including one or more available medium integrated servers and data centers The available medium may be a magnetic medium (such as a soft disk, a hard disk, and a magnetic tape), an optical medium (such as DVD), or a semiconductor medium (for example SSD).

According to another aspect of the embodiments of the present disclosure, an electronic device is provided, and includes a processor, where the processor includes the vehicle door unlocking control apparatus according to any one of the foregoing embodiments.

According to another aspect of the embodiments of the present disclosure, an electronic device is provided, and includes:

a memory configured to store executable instructions; and a processor configured to communicate with the memory to execute the executable instructions so as to complete the operations of the vehicle door unlocking control method according to any one of the foregoing embodiments.

According to another aspect of the embodiments of the present disclosure, a computer storage medium is provided, and configured to store computer readable instructions, where the instructions are executed, the operations of the vehicle door unlocking control method according to any one of the foregoing embodiments are performed.

Figure 20:
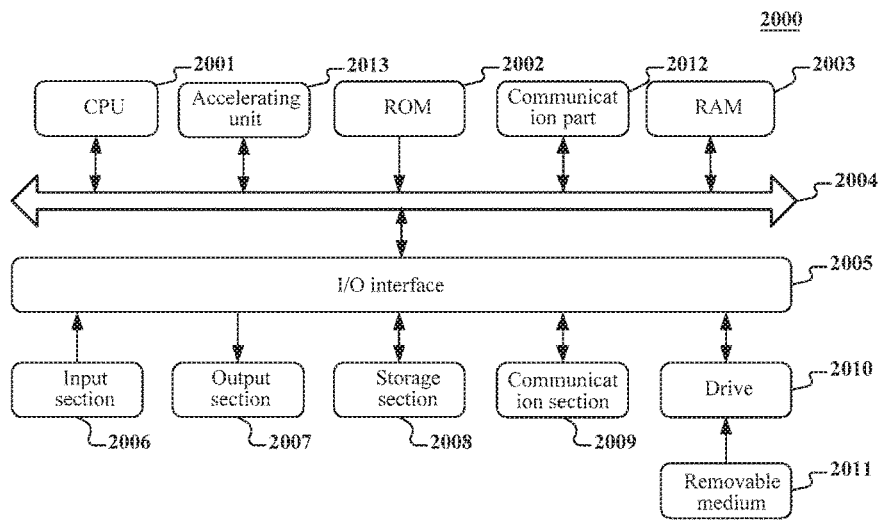
FIG. 20 is a schematic structural diagram of an electronic device suitable for implementing a terminal device or a server according to embodiments of the present disclosure.

An embodiment of the present disclosure further provides an electronic device, which may be, for example, a mobile terminal, a personal computer (PC), a tablet computer, or a server. With reference to FIG. 20 below, FIG. 20 is a schematic structural diagram of an electronic device 2000 suitable for implementing a terminal device or a server of the embodiment of the present disclosure. As shown in FIG. 20, the electronic device 2000 includes one or more processors, a communication part and the like. The one or more processors are, for example, one or more central processing units (CPUs) 2001, and/or one or more special-purpose processors; the special-purpose processor may be used as an accelerating unit 2013, and may include, but is not limited to, a special-purpose processor such as an image processor (GPU), an FPGA, a DSP, and other ASIC chip. The processor may perform various appropriate actions and processing according to executable instructions stored in a read-only memory (ROM) 2002 or executable instructions loaded from a storage section 2008 into a random access memory (RAM) 2003. The communication part 2012 may include, but is not limited to, a network card. The network card may include, but is not limited to, an Infiniband (IB) network card.

The processor may communicate with the ROM 2002 and/or the RAM 2003 to execute executable instructions. The processor is connected to the communication part 2012 via a bus 2004, and communicates with other target devices via the communication part 2012, thereby completing corresponding operations of the method provided by any one of the embodiments of the present disclosure, for example, obtaining an acquisition trigger signal; controlling, based on the acquisition trigger signal, a first camera assembly disposed on a vehicle to acquire a first face image of a user; performing feature matching between the first face image and a pre-stored second face image, and performing living body detection on the first face image; and sending a vehicle door unlocking instruction to a vehicle door lock of the vehicle in response to successful feature matching and successful living body detection.

In addition, the RAM 2003 may further store various programs and data required during an operation of the apparatus. The CPU 2001, the ROM 2002, and the RAM 2003 are connected to each other via the bus 2004. In the presence of the RAM 2003, the ROM 2002 is an optional module. The RAM 2003 stores executable instructions, or writes executable instructions to the ROM 2002 during running. The executable instructions cause the CPU 2001 to execute corresponding operations of the communication method. An input/output (I/O) interface 2005 is also connected to the bus 2004. The communication part 2012 may be integrated, or may configured to have a plurality of sub-modules (for example, a plurality of IB network cards) connected to the bus.

The following components are connected to the I/O interface 2005: an input section 2006 including a keyboard, a mouse and the like; an output section 2007 including a cathode-ray tube (CRT), a liquid crystal display (LCD), a speaker and the like; the storage section 2008 including a hard disk and the like; and a communication section 2009 of a network interface card including an LAN card, a modem and the like. The communication section 2009 performs communication processing via a network such as the Internet. A drive 2010 is also connected to the I/O interface 2005 according to requirements. A removable medium 2011 such as a magnetic disk, an optical disk, a magneto-optical disk, a semiconductor memory or the like is mounted on the drive 2010 according to requirements, so that a computer program read from the removable medium may be installed on the storage section 2008 according to requirements.

It should be noted that, the architecture shown in FIG. 20 is merely an optional implementation. During specific practice, a number and types of the components in FIG. 20 may be selected, decreased, increased, or replaced according to actual requirements. Different functional components may be separated or integrated or the like. For example, the accelerating unit 2013 and the CPU 2001 may be separated, or the accelerating unit 2013 may be integrated on the CPU 2001, and the communication part may be separated from or integrated on the CPU 2001 or the accelerating unit 2013 or the like. These alternative implementations all fall within the protection scope of the present disclosure.

Particularly, a process described above with reference to a flowchart according to an embodiment of the present disclosure may be implemented as a computer software program. For example, an embodiment of the present disclosure includes a computer program product. The computer program product includes a computer program tangibly included in a machine-readable medium. The computer program includes a program code for executing the method shown in the flowchart. The program code may include instructions for executing the corresponding steps of the method according to the embodiments of the present disclosure, for example, obtaining an acquisition trigger signal; controlling, based on the acquisition trigger signal, a first camera assembly disposed on a vehicle to acquire a first face image of a user; performing feature matching between the first face image and a pre-stored second face image, and performing living body detection on the first face image; and sending a vehicle door unlocking instruction to a vehicle door lock of the vehicle in response to successful feature matching and successful living body detection. In such embodiment, the computer program is downloaded and installed from the network through the communication section 2009, and/or is installed from the removable medium 2011. The computer program, when being executed by the CPU 2001, executes the operations of the foregoing functions defined in the method of the present disclosure.

The embodiments in the specification are all described in a progressive manner, for same or similar parts in the embodiments, refer to these embodiments, and each embodiment focuses on a difference from other embodiments. The system embodiments correspond to the method embodiments substantially and therefore are only described briefly, and for the associated part, refer to the descriptions of the method embodiments.

The methods and apparatuses in the present invention may be implemented in many manners. For example, the methods and apparatuses in the present invention may be implemented with software, hardware, firmware, or any combination of software, hardware, and firmware. The foregoing specific sequence of steps of the method is merely for description, and unless otherwise stated particularly, is not intended to limit the steps of the method in the present disclosure. In addition, in some embodiments, the present disclosure may alternatively be implemented as programs recorded in a recording medium. The programs include machine-readable instructions for implementing the methods according to the present disclosure. Therefore, the present disclosure further covers the recording medium storing the programs for performing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual application of the present disclosure, and to make a person of ordinary skill in the art understand the present disclosure, so as to design various embodiments with various modifications applicable to particular use.

What is claimed is:

1. A vehicle door unlocking control method, comprising:
   obtaining an acquisition trigger signal by an acquisition apparatus disposed on the vehicle, wherein the acquisition apparatus comprises a non-contact type acquisition apparatus;
   controlling, based on the acquisition trigger signal, a first camera assembly disposed on a vehicle to acquire a first face image of a user;
   performing feature matching between the first face image and a pre-stored second face image;
   performing a living body detection on the first face image; and
   after sending a vehicle door unlocking instruction to at least one vehicle door lock of the vehicle in response to successful feature matching and successful living body detection, controlling the acquisition apparatus to be turned off,
   wherein the non-contact type acquisition apparatus comprises a first camera, and the acquisition trigger signal comprises gesture information, wherein the first camera is any camera in the first camera assembly, and
   wherein the controlling, based on the acquisition trigger signal, a first camera assembly disposed on a vehicle to acquire a first face image of a user comprises:
   controlling, if the gesture information acquired by the first camera matches pre-stored gesture information, the first camera assembly to acquire the first face image of the user, wherein a sampling frequency of the first camera is lower than a preset sampling frequency.

2. The method according to claim 1,
   wherein the acquisition apparatus further comprises a contact type acquisition apparatus,
   wherein the contact type acquisition apparatus is disposed on at least one of the following locations: a pillar B of the vehicle, at least one vehicle door handle, at least one vehicle door, and at least one rear-view mirror, and the non-contact type acquisition apparatus is disposed on at least one of the following locations: the pillar B of the vehicle, at least one vehicle door, and at least one rear-view mirror.

3. The method according to claim 2, wherein the contact type acquisition apparatus comprises a fingerprint acquisition apparatus, and the acquisition trigger signal comprises fingerprint data, and the controlling, based on the acquisition trigger signal, a first camera assembly disposed on a vehicle to acquire a first face image of a user comprises:

controlling, if the fingerprint data acquired by the fingerprint acquisition apparatus matches pre-stored fingerprint data, the first camera assembly to acquire the first face image of the user.

4. The method according to claim 2, wherein the non-contact type acquisition apparatus comprises a voice acquisition apparatus, and the acquisition trigger signal comprises voice information, and
the controlling, based on the acquisition trigger signal, a first camera assembly disposed on a vehicle to acquire a first face image of a user comprises:
controlling, if the voice information acquired by the voice acquisition apparatus matches pre-stored voice information, the first camera assembly to acquire the first face image of the user.

5. The method according to claim 1, wherein the obtaining an acquisition trigger signal comprises:
receiving a control instruction sent by a terminal device communicationally connected to the vehicle, the acquisition trigger signal comprising the control instruction.

6. The method according to claim 2, wherein before the obtaining the acquisition trigger signal by an acquisition apparatus disposed on the vehicle, the method further comprises:
controlling the acquisition apparatus to be turned on, if it is detected that a vehicle engine is off, a duration during which the vehicle engine is off exceeds a preset duration, the vehicle engine is off and the vehicle door is locked, or, a start control signal of the acquisition apparatus is received.

7. The method according to claim 1, wherein before the obtaining an acquisition trigger signal, the method further comprises:
receiving a monitoring instruction sent by a monitoring apparatus disposed on the vehicle, the monitoring instruction being sent by the monitoring apparatus when monitoring that a duration during which a human body stays in front of the vehicle door is greater than a preset value;
controlling, according to the monitoring instruction, the first camera assembly to perform photographing, to obtain monitoring data; and
saving the monitoring data.

8. The method according to claim 1, wherein after the sending a vehicle door unlocking instruction to at least one vehicle door lock of the vehicle in response to successful feature matching and successful living body detection, the method further comprises:
controlling a second camera to acquire a third face image of a driver, the second camera being disposed inside the vehicle;
performing feature matching between the third face image and a pre-stored driver image; and
sending, if the facial features of the third face image do not match the facial features of the driver image, a vehicle start stopping instruction to a vehicle starting apparatus.

9. The method according to claim 1, wherein the first camera assembly comprises a plurality of cameras at different heights, wherein the first camera assembly comprises at least one 3D depth camera; and/or
the first camera assembly comprises at least one RGB camera or infrared camera, wherein
the first camera assembly comprises at least one camera disposed inside the vehicle; and/or
the first camera assembly comprises at least one camera disposed at the pillar B of the vehicle, the vehicle door, or the rear-view mirror.

10. The method according to claim 1, wherein the method further comprises:
displaying, by a display device, at least one of the following information: the image acquisition result of the first camera assembly, the operating state of the vehicle, and the feature matching results of the first face image and the second face image, the living body detection result of the first face image, the unlocking result of the vehicle door, and the obtaining result of the acquisition trigger signal.

11. The method according to claim 10, wherein the display device is disposed on at least one of the following locations: the pillar B of the vehicle, the vehicle door of the vehicle, and the rear-view mirror of the vehicle, wherein at least one camera in the first camera assembly is disposed on the display device.

12. A vehicle, comprising: a vehicle body, wherein the vehicle body is provided with a first camera assembly and a vehicle door unlocking controller; the vehicle door unlocking controller comprises: an acquisition apparatus, a face comparator, a living body detector, and an unlocking controller; the face comparator is connected to the first camera assembly and the unlocking controller; the living body detector is connected to the first camera assembly and the unlocking controller; and the unlocking controller is connected to at least one vehicle door lock of the vehicle body, wherein the vehicle body is provided with a non-contact type acquisition apparatus,
wherein the acquisition apparatus is configured to obtain an acquisition trigger signal that comprises gesture information;
the vehicle door unlocking controller is configured to control, based on the acquisition trigger signal, a first camera assembly disposed on a vehicle to acquire a first face image of a user;
the face comparator is configured to perform feature matching between the first face image and a pre-stored second face image;
the living body detector is configured to perform a living body detection on the first face image;
the unlocking controller is configured to send a vehicle door unlocking instruction to at least one vehicle door lock of the vehicle in response to successful feature matching and successful living body detection; and
the vehicle door unlocking controller is further configured to, after the unlocking controller sends the vehicle door unlocking instruction, control the acquisition apparatus to be turned off,
wherein the non-contact type acquisition apparatus comprises a first camera,
wherein the first camera is any camera in the first camera assembly, and
the face comparator is configured to control, if the gesture information acquired by the first camera matches pre-stored gesture information, the first camera assembly to acquire the first face image of the user, wherein a sampling frequency of the first camera is lower than a preset sampling frequency.

13. The vehicle according to claim 12, wherein the vehicle body is further provided with a contact type acquisition apparatus, wherein the contact type acquisition apparatus is connected to the first camera assembly and configured to acquire the acquisition trigger signal for triggering the first camera assembly to work, and the non-contact type acquisition apparatus being connected to the first camera assembly and configured to acquire the acquisition trigger signal for triggering the first camera assembly to work,
wherein the contact type acquisition apparatus is disposed on at least one of the following locations: a pillar B of the vehicle, at least one vehicle door handle, at least one vehicle door, and at least one rear-view mirror, and the non-contact type acquisition apparatus is disposed on at least one of the following locations: the pillar B of the vehicle, at least one vehicle door, and at least one rear-view mirror.

14. The vehicle according to claim 13, wherein the contact type acquisition apparatus comprises a fingerprint acquisition apparatus disposed on an outdoor part of the vehicle body, and a touch sensor disposed on the outdoor part of the vehicle body.

15. The vehicle according to claim 13, wherein the non-contact type acquisition apparatus comprises a first camera,
wherein the first camera is any camera in the first camera assembly,
wherein the first camera is disposed on at least one of the following locations: the pillar B of the vehicle body, at least one rear-view mirror of the vehicle body, and at least one vehicle door of the vehicle body, wherein the sampling frequency of the first camera is lower than a preset sampling frequency.

16. The vehicle according to claim 13, wherein the non-contact type acquisition apparatus comprises a voice acquisition apparatus, wherein the voice acquisition apparatus is disposed on at least one of: at least one vehicle door handle of the vehicle body, a pillar B of the vehicle body, at least one rear-view mirror of the vehicle body, and at least one vehicle door of the vehicle body.

17. The vehicle according to claim 12, wherein the first camera assembly is communicationally connected to a terminal device, and the terminal device is configured to send the acquisition trigger signal for triggering the first camera assembly to work.

18. The vehicle according to claim 12, wherein the vehicle body further comprises a monitoring apparatus connected to the first camera assembly and configured to send a monitoring instruction to the first camera assembly when monitoring that a duration during which a human body stays in front of the vehicle door is greater than a preset value, the first camera assembly performing photographing based on the control of the monitoring instruction, to obtain monitoring data.

19. The vehicle according to claim 12, wherein a second camera connected to the face comparator is disposed inside the vehicle body, and the second camera is configured to send a captured driver image to the face comparator.

20. The vehicle according to claim 12, wherein the first camera assembly comprises a plurality of cameras at different heights,
wherein the first camera assembly comprises at least one 3D depth camera, or
the first camera assembly comprises at least one RGB camera or infrared camera,
wherein the first camera assembly comprises at least one camera disposed inside the vehicle body, or the first camera assembly comprises at least one camera disposed at the pillar B of the vehicle body, the vehicle door, or the rear-view mirror.

21. The vehicle according to claim 12, wherein a display device is disposed on an outdoor part of the vehicle body, and the display device is connected to at least one of the first camera assembly, the face comparator, the living body detector, and the unlocking controller, wherein the display device is disposed on at least one of the following locations: the pillar B of the vehicle body, the vehicle door of the vehicle body, and the rear-view mirror of the vehicle body,
wherein at least one camera in the first camera assembly is disposed on the display device.

22. A vehicle door unlocking control apparatus, comprising:
a processor, and a memory storing instructions, wherein the instructions, when executed by the processor, cause the processor to perform operations, the operations comprising:
obtaining an acquisition trigger signal by an acquisition apparatus disposed on the vehicle, wherein the acquisition apparatus comprises a non-contact type acquisition apparatus;
controlling, based on the acquisition trigger signal, a first camera assembly disposed on a vehicle to acquire a first face image of a user;
performing feature matching between the first face image and a pre-stored second face image;
performing living body detection on the first face image; and
after sending a vehicle door unlocking instruction to at least one vehicle door lock of the vehicle in response to successful feature matching and successful living body detection, controlling the acquisition apparatus to be turned off,
wherein the non-contact type acquisition apparatus comprises a first camera, and the acquisition trigger signal comprises gesture information, wherein the first camera is any camera in the first camera assembly,
wherein the controlling, based on the acquisition trigger signal, a first camera assembly disposed on a vehicle to acquire a first face image of a user comprises:
controlling, if the gesture information acquired by the first camera matches pre-stored gesture information, the first camera assembly to acquire the first face image of the user, wherein a sampling frequency of the first camera is lower than a preset sampling frequency.

23. A non-transitory computer-readable storage medium, configured to store computer-readable instructions, wherein when the instructions are executed, the operations in the steps of the vehicle door unlocking control method according to claim 1 are implemented.

* * * * *